US011982863B2

(12) United States Patent
Saito et al.

(10) Patent No.: US 11,982,863 B2
(45) Date of Patent: May 14, 2024

(54) CAMERA ACTUATOR, CAMERA MODULE, AND CAMERA MOUNTING DEVICE

(71) Applicant: MITSUMI ELECTRIC CO., LTD., Tokyo (JP)

(72) Inventors: Masahiro Saito, Tokyo (JP); Keiichi Yamamoto, Tokyo (JP); Hiroshi Matsuda, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 494 days.

(21) Appl. No.: 17/050,840

(22) PCT Filed: Apr. 10, 2019

(86) PCT No.: PCT/JP2019/015690
§ 371 (c)(1),
(2) Date: Oct. 27, 2020

(87) PCT Pub. No.: WO2019/208227
PCT Pub. Date: Oct. 31, 2019

(65) Prior Publication Data
US 2021/0231906 A1    Jul. 29, 2021

(30) Foreign Application Priority Data

Apr. 27, 2018  (JP) ................. 2018-087355

(51) Int. Cl.
*H04N 23/68*  (2023.01)
*G02B 7/09*  (2021.01)

(52) U.S. Cl.
CPC ............. *G02B 7/09* (2013.01); *H04N 23/687* (2023.01)

(58) Field of Classification Search
CPC ... G02B 7/04; G02B 7/09; G02B 7/10; G02B 27/64; G02B 27/646; H04N 23/68;
(Continued)

(56) References Cited

U.S. PATENT DOCUMENTS

| 2004/0100561 A1 | 5/2004 | Shinohara et al. |
| 2013/0170039 A1 | 7/2013 | Miyoshi |
| 2018/0017844 A1 | 1/2018 | Yu et al. |

FOREIGN PATENT DOCUMENTS

| CN | 105005169 | 10/2015 |
| CN | 107608052 | 1/2018 |

(Continued)

OTHER PUBLICATIONS

International Search Report and the Written Opinion dated Jun. 18, 2019 From the International Searching Authority Re. Application No. PCT/JP2019/015690 and Its Translation of Search Report Into English. (10 Pages).

*Primary Examiner* — Clayton E. LaBalle
*Assistant Examiner* — Fang-Chi Chang

(57) ABSTRACT

A camera actuator comprises: a fixed-side member; a movable-side member provided so as to be displaced in relation to the fixed-side member, the movable-side member holding a lens unit; and a drive unit that generates drive force to displace the movable-side member within a plane including a first direction and a second direction orthogonal to the first direction, the drive unit generating as drive force a combined force obtained by combining a propulsion force that displaces the movable-side member in a specified direction that is either the first direction or the second direction, and a resistance force that resists an external force acting so as to cause the movable-side member to deviate from the specified direction.

11 Claims, 32 Drawing Sheets

(58) Field of Classification Search
CPC .. H04N 23/682; H04N 23/685; H04N 23/687; G03B 3/00; G03B 3/02; G03B 13/32; G03B 13/34; G03B 13/36; G03B 2205/0007; G03B 2205/0015; G03B 2205/0053; G03B 2205/0069
See application file for complete search history.

(56) References Cited

FOREIGN PATENT DOCUMENTS

| | | |
|---|---|---|
| JP | 08-184870 | 7/1996 |
| JP | 2004-080457 | 3/2004 |
| JP | 2010-128386 | 6/2010 |
| JP | 2010-128387 | 6/2010 |
| JP | 2013-125228 | 6/2013 |
| JP | 2013-125230 | 6/2013 |
| JP | 2015-055776 | 3/2015 |
| JP | 2015-092285 | 5/2015 |
| JP | 2017-037254 | 2/2017 |
| JP | 2018-010295 | 1/2018 |
| JP | 2017-037254 | 7/2020 |
| JP | 2015-092285 | 10/2020 |
| WO | WO-2018019831 A1 * | 2/2018 ......... G02B 26/0875 |
| WO | WO 2019/208227 | 10/2019 |

* cited by examiner

CAMERA ACTUATOR, CAMERA MODULE, AND CAMERA MOUNTING DEVICE

TECHNICAL FIELD

The present invention relates to a camera actuator, a camera module, and a camera-mounted apparatus.

BACKGROUND ART

Conventionally, a thin camera-mounted apparatus on which a camera module is mounted, such as a smartphone and a digital camera, has been known. The camera module includes a lens part including one or more lenses, and an imaging element that captures a subject image formed by the lens part (see Patent Literature (hereinafter, referred to as "PTL") 1).

The camera module disclosed in PTL 1 has an autofocusing function (hereinafter, referred to as "AF (Auto Focus) function") of automatically performing focusing when a picture of a subject is taken, and a shake-correcting function (hereinafter, referred to as "OIS (Optical Image Stabilization) function") of correcting camera shake generated in a camera. Such a camera module includes an autofocus actuator for moving the lens part in a direction of an optical axis, and a shake correction actuator for moving the lens part within a plane orthogonal to the direction of the optical axis.

CITATION LIST

Patent Literature

PTL 1
Japanese Patent Application Laid-Open No. 2015-92285

SUMMARY OF INVENTION

Technical Problem

In the case of the camera module disclosed in PTL 1 as described above, each actuator described above displaces the lens in a specific direction (for example, in the direction of the optical axis or in a direction orthogonal to the direction of the optical axis) during autofocusing or shake correction. In such a camera module, a camera actuator capable of accurately displacing the lens toward the specific direction is desired.

An object of the present invention is to provide a camera actuator, a camera module, and a camera-mounted apparatus capable of accurately displacing a lens toward a specific direction.

Solution to Problem

One aspect of a camera actuator according to the present invention includes: a fixed-side member; a movable-side member provided so as to be displaceable with respect to the fixed-side member and holding a lens part; and a driving section that generates a driving force that displaces the movable-side member within a plane including a first direction and a second direction orthogonal to the first direction, wherein the driving section generates as the driving force a resultant force obtained by combining thrust that displaces the movable-side member in a specific direction that is either the first direction or the second direction, and a resistance force that resists an external force acting so as to cause the movable-side member to deviate from the specific direction.

One aspect of a camera module according to the present invention includes: the camera actuator described above; and an imaging element arranged at a stage subsequent to a lens part.

One aspect of a camera-mounted apparatus according to the present invention includes: the camera module described above; and a control section that controls the camera module.

Advantageous Effects of Invention

According to the present invention, it is possible to provide a camera actuator, a camera module, and a camera-mounted apparatus capable of accurately displacing a lens toward a specific direction.

DESCRIPTION OF EMBODIMENTS

Hereinafter, embodiments according to the present invention will be described in detail with reference to the accompanying drawings.

Embodiment 1

A camera module according to Embodiment 1 of the present invention will be described with reference to FIGS. 1 to 23B. Hereinafter, an outline of camera module 1 and then specific structures of prism module 2, lens module 3, and imaging element module 4 included in camera module 1 will be described. Note that, the camera actuator, the camera module, and the camera-mounted apparatus according to the present invention may include all configurations to be described later or may not include some of the configurations.

[Camera Module]

Figure 27A:
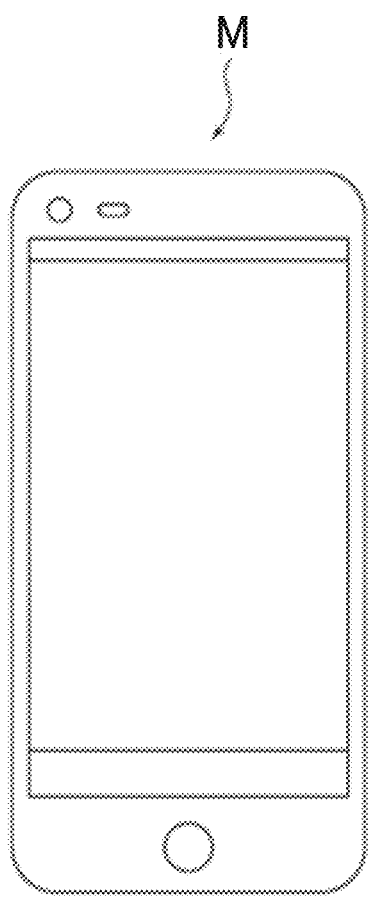
FIGS. 27A and 27B illustrate an example of a camera-mounted apparatus on which the camera module is mounted.
Figure 27B:
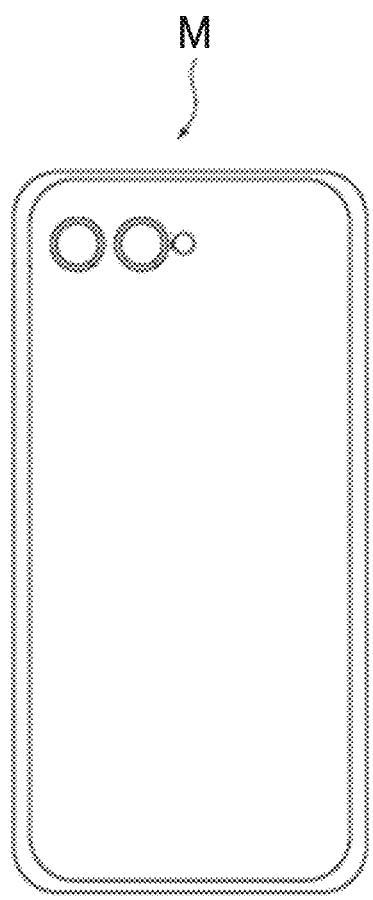

Camera module 1 is mounted on a thin camera-mounted apparatus, for example, smartphone M (see FIGS. 27A and 27B), a mobile phone, a digital camera, a notebook computer, a tablet terminal, a portable game machine, an in-vehicle camera or the like.

Hereinafter, each component of camera module 1 of the present embodiment will be described based on a state in which each component is incorporated in camera module 1. Further, in the description of the structure of camera module 1 of the present embodiment, an orthogonal coordinate system (X, Y, Z) is used. The drawings to be described later are also illustrated with a common orthogonal coordinate system (X, Y, Z).

In a case where the camera-mounted apparatus is used to take a picture in practice, camera module 1 is mounted such that the X direction is the left-right direction, the Y direction is the up-down direction, and the Z direction is the front-rear direction, for example. Light from a subject enters prism 23 of prism module 2 from the + side (plus side) in the Z direction as indicated by long dashed short dashed line α (also referred to as first optical axis) in FIG. 2. The light incident on prism 23 is bent at optical path bending surface 231 (see FIG. 8) of prism 23 as indicated by long dashed short dashed line β (also referred to as second optical axis) in FIGS. 2 and 9C and is guided to lens part 33 of lens module 3 arranged at a stage subsequent to (that is, on the + side in the X direction) prism 23. A subject image formed by lens part 33 (see FIG. 9C) is then captured by imaging element module 4 (see FIG. 1) arranged at a stage subsequent to lens module 3.

Camera module 1 described above performs shake correction (optical image stabilization (OIS)) using first shake correction apparatus 24 (see FIG. 2) incorporated in prism module 2 and second shake correction apparatus 35 (see FIG. 11) incorporated in lens module 3. Further, camera module 1 described above performs autofocusing by displacing lens part 33 in the X direction using AF apparatus 34 (see FIG. 11) incorporated in lens module 3.

Hereinafter, prism module 2, lens module 3, and imaging element module 4 included in camera module 1 of the present embodiment will be described with reference to FIGS. 1 to 23B.

[Prism Module]

Prism module 2 will be described with reference to FIGS. 1 to 8. Prism module 2 includes first cover 21, first base 22, prism 23, and first shake correction apparatus 24.

[First Cover]

Figure 1:
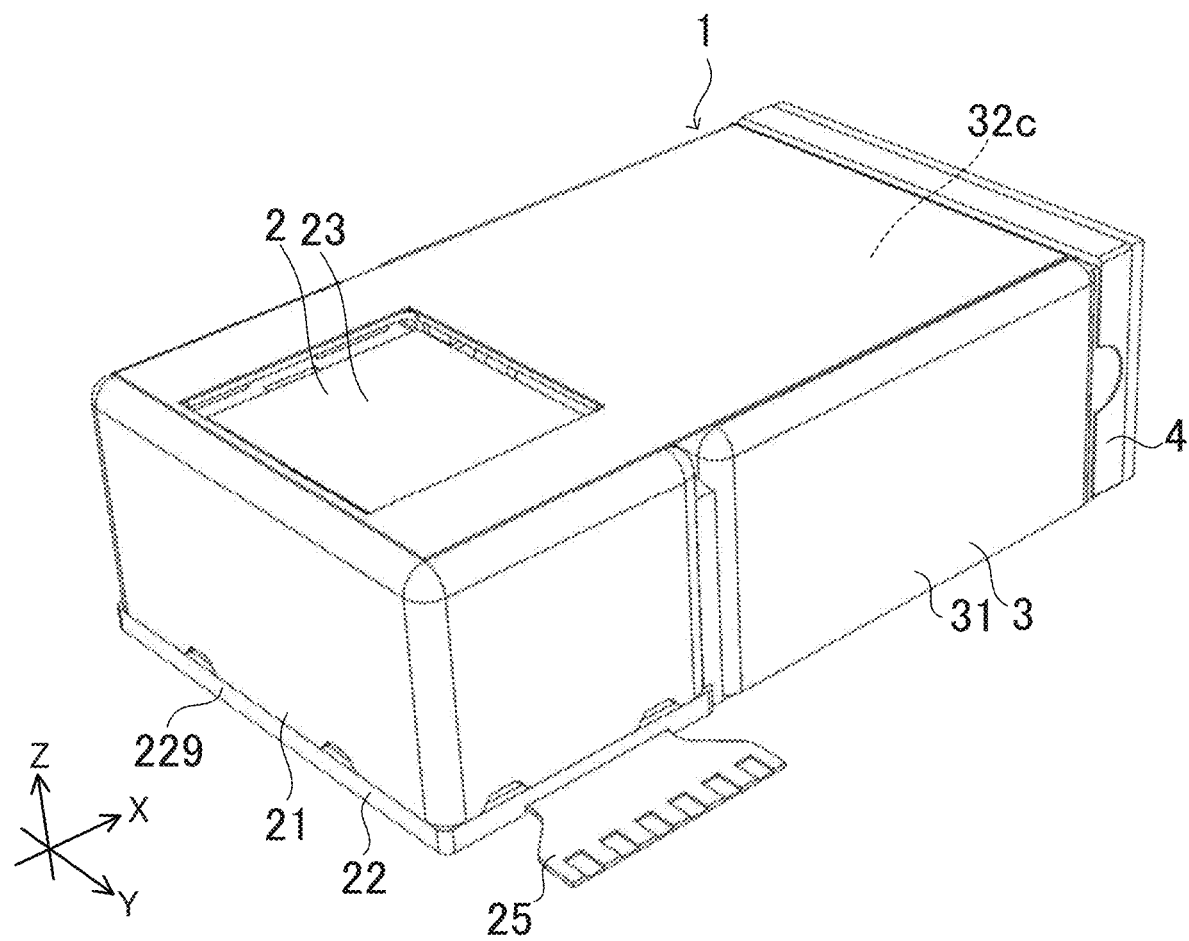
FIG. 1 is a perspective view of a camera module according to an embodiment of the present invention.
Figure 2:
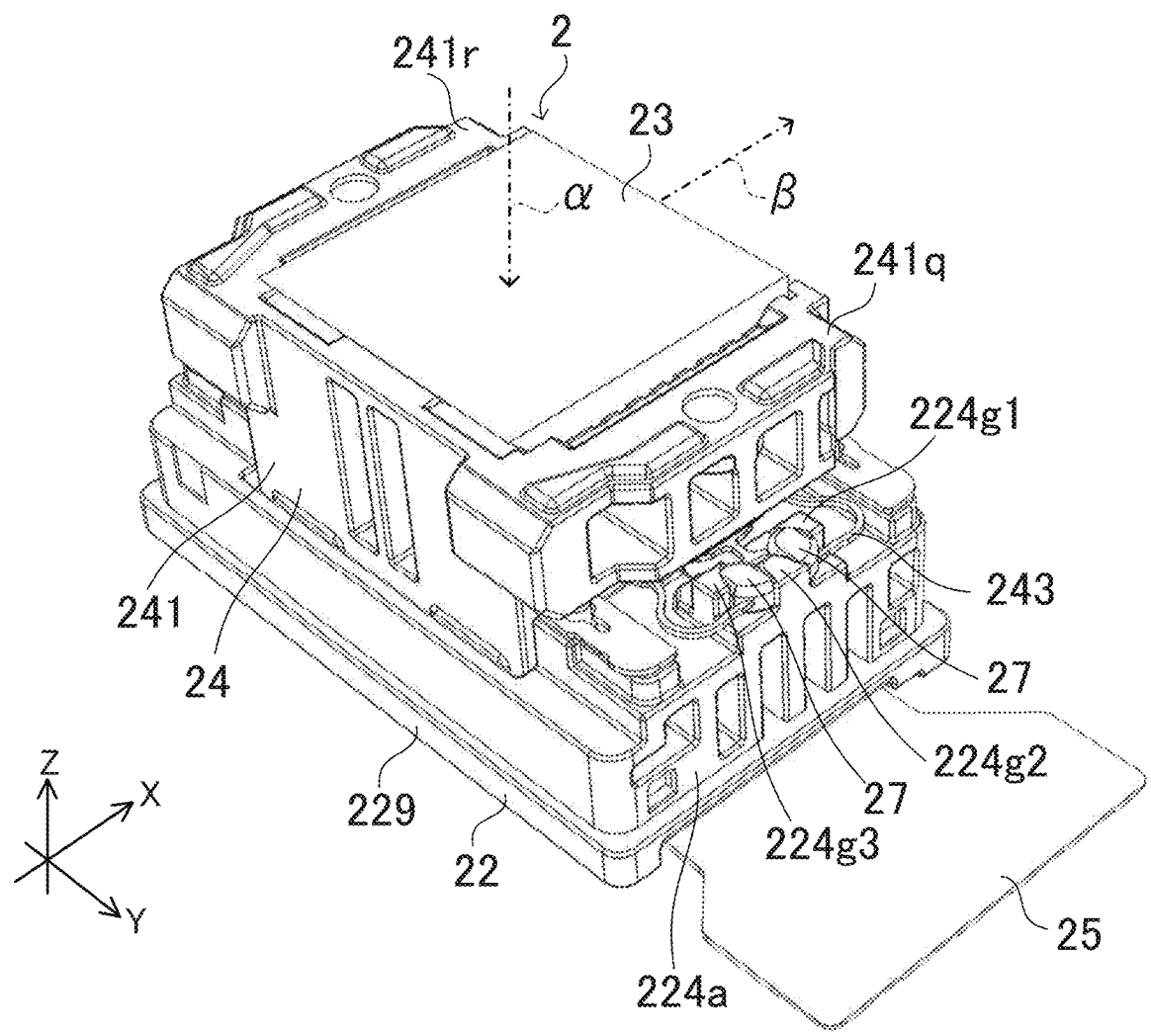
FIG. 2 is a perspective view of a prism module of the camera module in a state in which some members are omitted from the prism module.
Figure 3:
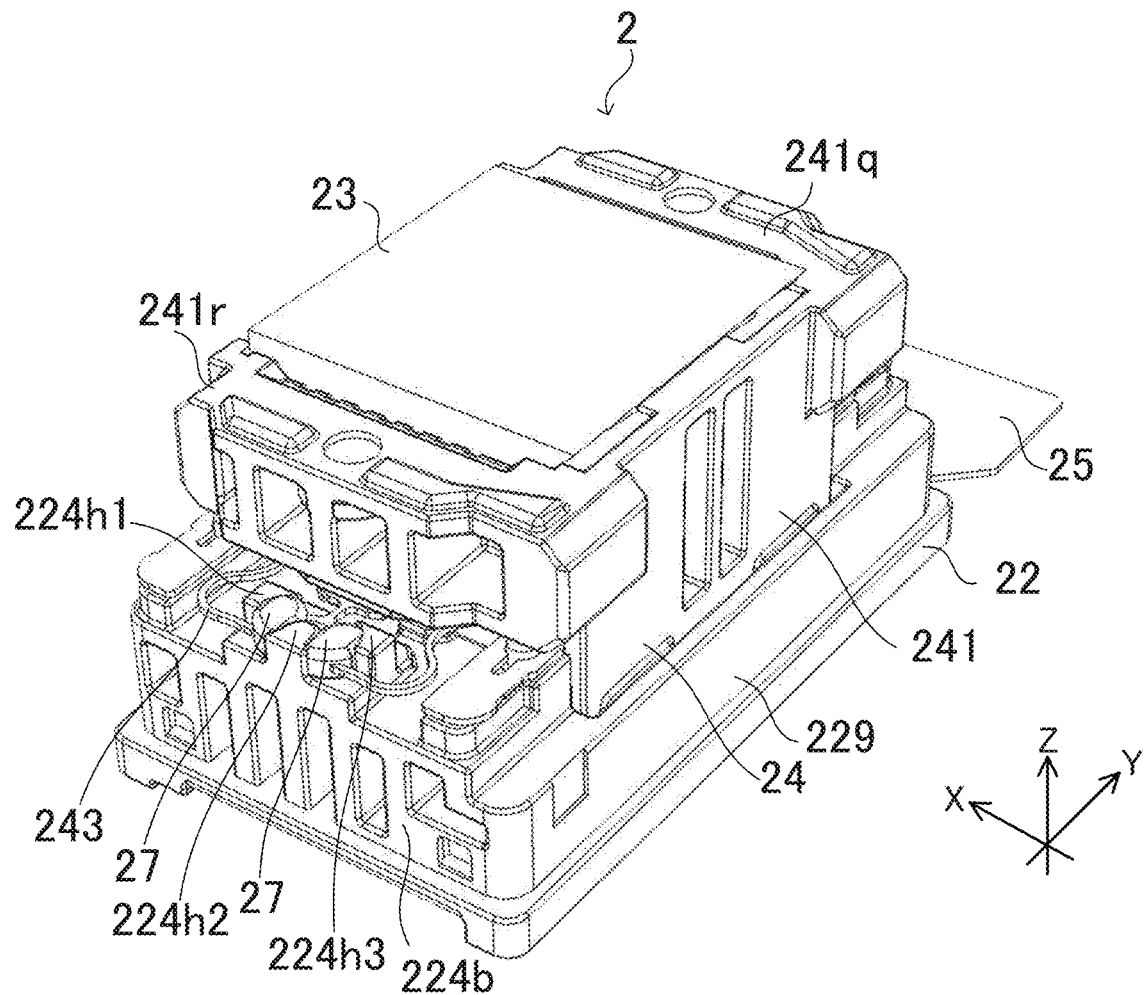
FIG. 3 is a perspective view of the prism module from which some members are omitted, in a state in which the prism module is viewed from an angle different from that in FIG. 2.

As illustrated in FIG. 1, first cover 21 is a box-shaped member that is made of, for example, a synthetic resin or a nonmagnetic metal, and is open on the both sides in the Z direction and on the + side in the X direction. Light from a side of the subject can enter an internal space of first cover 21 through an opening on the + side in the Z direction of first cover 21. First cover 21 as described above is combined with first base 22 to be described later from the + side in the Z direction.

[First Base]

Figure 5:
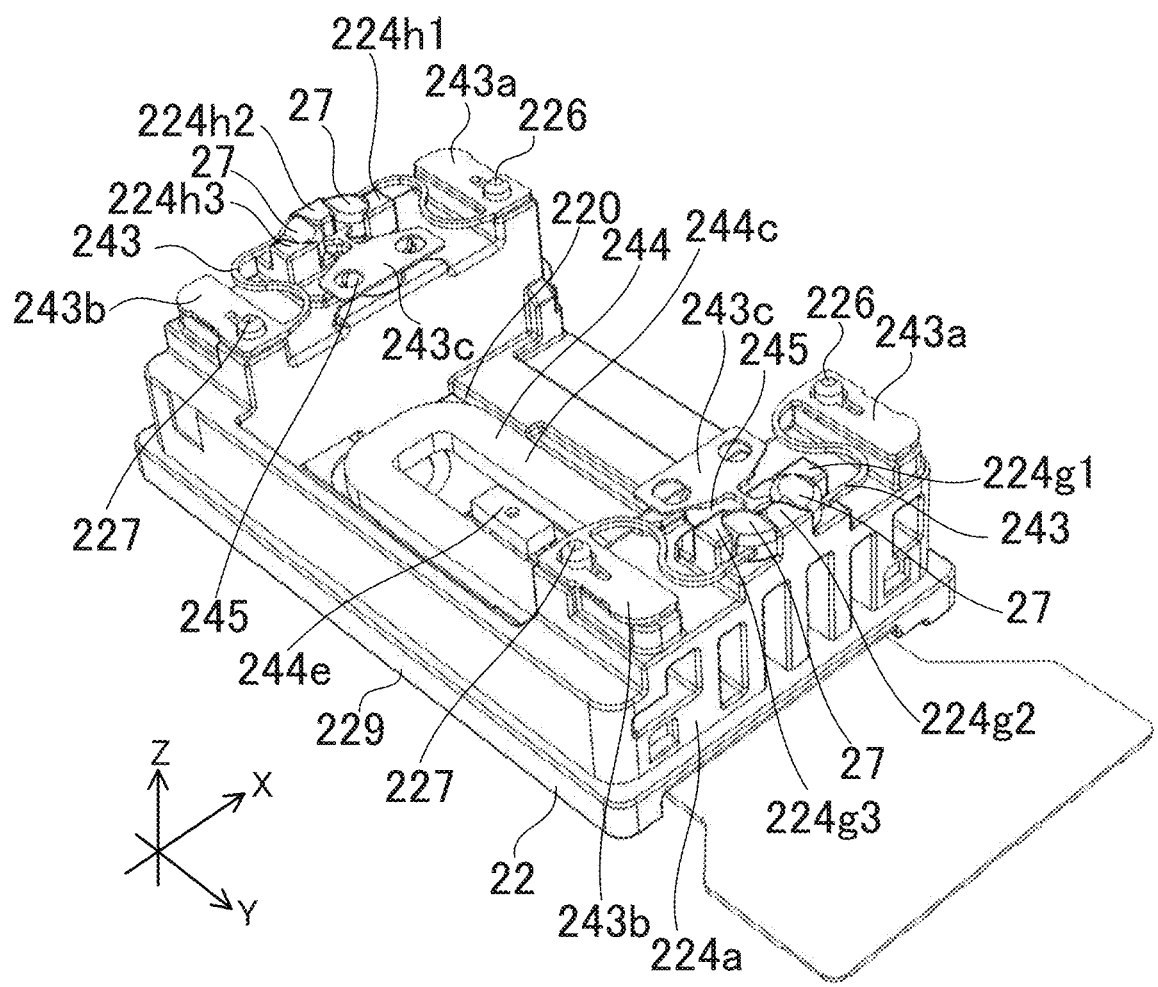
FIG. 5 is a perspective view of the first base.
Figure 6:
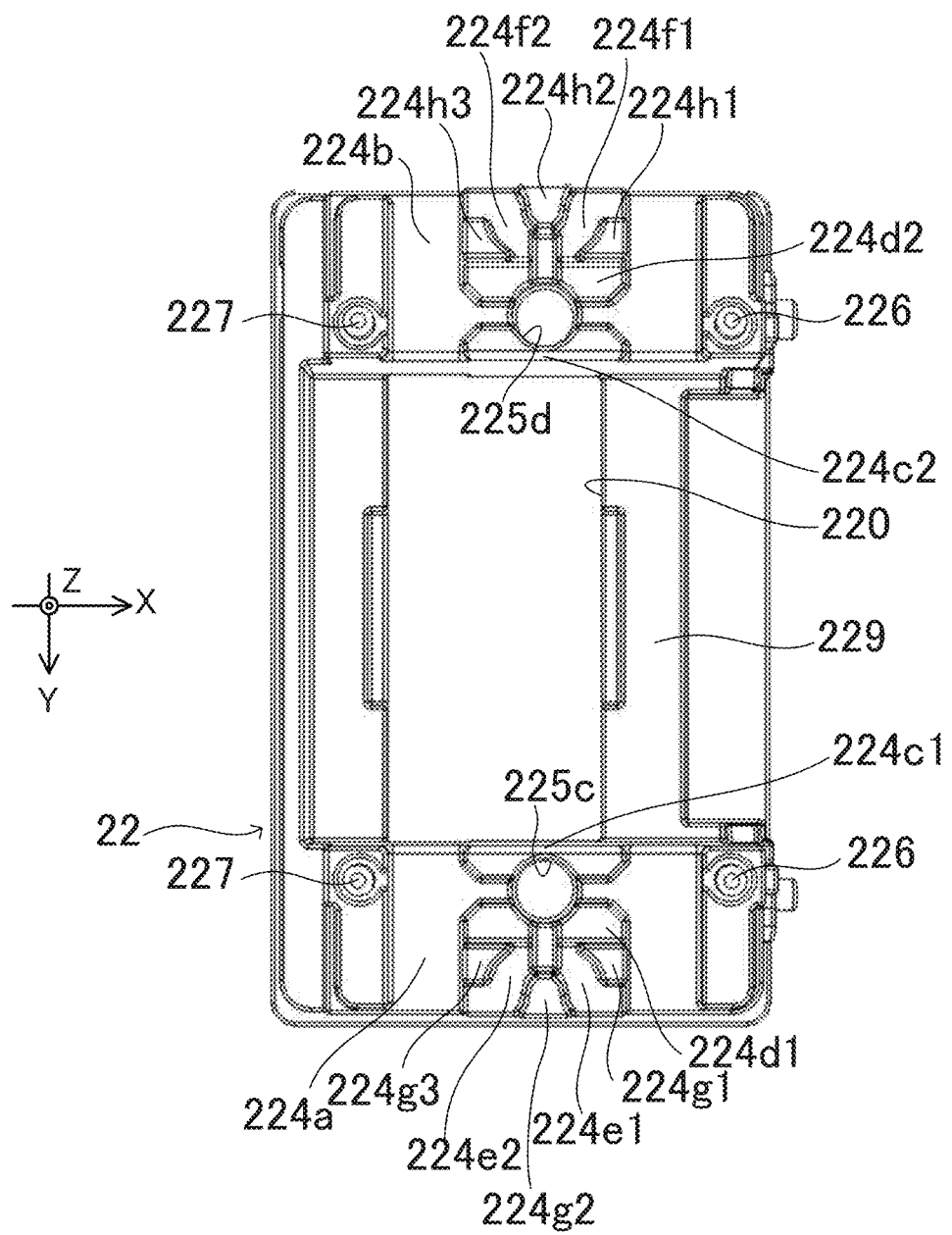
FIG. 6 is a plan view of the first base.

First base 22 will be described with reference to FIGS. 5 and 6. First base 22 is a box-shaped member that is open on the + side in the Z direction and on the + side in the X direction, respectively. First base 22 includes base-side opening 220 in bottom wall part 229 on the − side in the Z direction.

In the case of the present embodiment, first coil 244c and first Hall element 244e of front-side OIS actuator 244 are arranged in base-side opening 220.

First base 22 supports holder 241 of first shake correction apparatus 24 to be swingable about a first axis parallel to the Y direction. For this purpose, first base 22 includes first receiver part 225c and second receiver part 225d for holding swing guide member 245 to be described later.

First receiver part 225c is provided in first side wall part 224a on the + side in the Y direction of first base 22. On the other hand, second receiver part 225d is provided in first side wall part 224b on the − side in the Y direction of first base 22.

First receiver part 225c and second receiver part 225d as such have shapes symmetrical with each other in the Y direction. Specifically, first receiver part 225c and second receiver part 225d are cylindrical recesses that open only on end surfaces (upper surfaces) on the + side in the Z direction of first side wall part 224a and first side wall part 224b, respectively.

First side wall part 224a includes first weir part 224c1 between an inner end edge in the Y direction and first receiver part 225c on the upper surface. On the other hand, first side wall part 224b includes first weir part 224c2 between an inner end edge in the Y direction and second receiver part 225d on the upper surface. Each of first weir part 224c1 and first weir part 224c2 as such contributes to prevention of an adhesive, which fixes swing guide member 245 to first receiver part 225c and second receiver part 225d, from flowing on a center side in the Y direction.

First side wall part 224a includes second weir part 224d1 in a portion surrounding a part of an outer half part in the Y direction of first receiver part 225c on the upper surface. On the other hand, first side wall part 224b includes second weir part 224d2 in a portion surrounding a part of an outer half part in the Y direction of second receiver part 225d on the upper surface. Each of second weir parts 224d1 and 224d2 as such contributes to prevention of an adhesive, which fixes swing guide member 245 to first receiver part 225c and second receiver part 225d, from flowing into the outside in the Y direction.

First side wall part 224a includes spring arrangement spaces 224e1 and 224e2 in a portion on an outer side in the Y direction of second weir part 224d1 on the upper surface. In the case of the present embodiment, spring arrangement spaces 224e1 and 224e2 are separated from each other in the X direction.

On the other hand, first side wall part 224b includes spring arrangement spaces 224f1 and 224f2 in a portion on an outer side in the Y direction of second weir part 224d2 on the upper surface. Spring arrangement spaces 224f1 and 224f2 are separated from each other in the X direction. In each of spring arrangement spaces 224e1 and 224e2 and spring arrangement spaces 224f1 and 224f2, a part (specifically, base end-side continuous part 243j1) of continuous part 243i of swing support spring 243 (see FIG. 7) to be described later is arranged.

In the portion on the outer side in the Y direction of second weir part 224d1 on the upper surface, first side wall part 224a includes three protrusions 224g1, 224g2 and 224g3 in this order from the + side in the X direction. Protrusions 224g1 and 224g3 are separated from each other in the X direction and are arranged at the same position in the Y direction. Protrusion 224g2 is arranged on an outer side in the Y direction (the lower side in FIG. 6) of protrusion 224g1 and protrusion 224g3.

Spring arrangement space 224e1 is present between protrusions 224g1 and 224g2. On the other hand, spring arrangement space 224e2 is present between protrusions 224g2 and 224g3.

In the portion on the outer side in the Y direction of second weir part 224d2 on the upper surface, first side wall part 224b includes three protrusions 224h1, 224h2 and 224h3 in this order from the + side in the X direction. Protrusions 224h1 and 224h3 are separated from each other in the X direction and are arranged at the same position in the Y direction. Protrusion 224h2 is arranged on an outer side in the Y direction (the upper side in FIG. 6) of protrusions 224h1 and 224h3.

Spring arrangement space 224f1 is provided between protrusions 224h1 and 224h2. On the other hand, spring arrangement space 224f2 is provided between protrusions 224h2 and 224h3.

Each of first side wall parts 224a and 224b includes first positioning protrusion 226 and second positioning protrusion 227 in both end parts in the X direction on the upper surface. Each of first positioning protrusion 226 and second positioning protrusion 227 engages with a pair of swing support springs 243 (see FIG. 7) to be described later to position the pair of swing support springs 243.

[First Shake Correction Apparatus]

Figure 4:
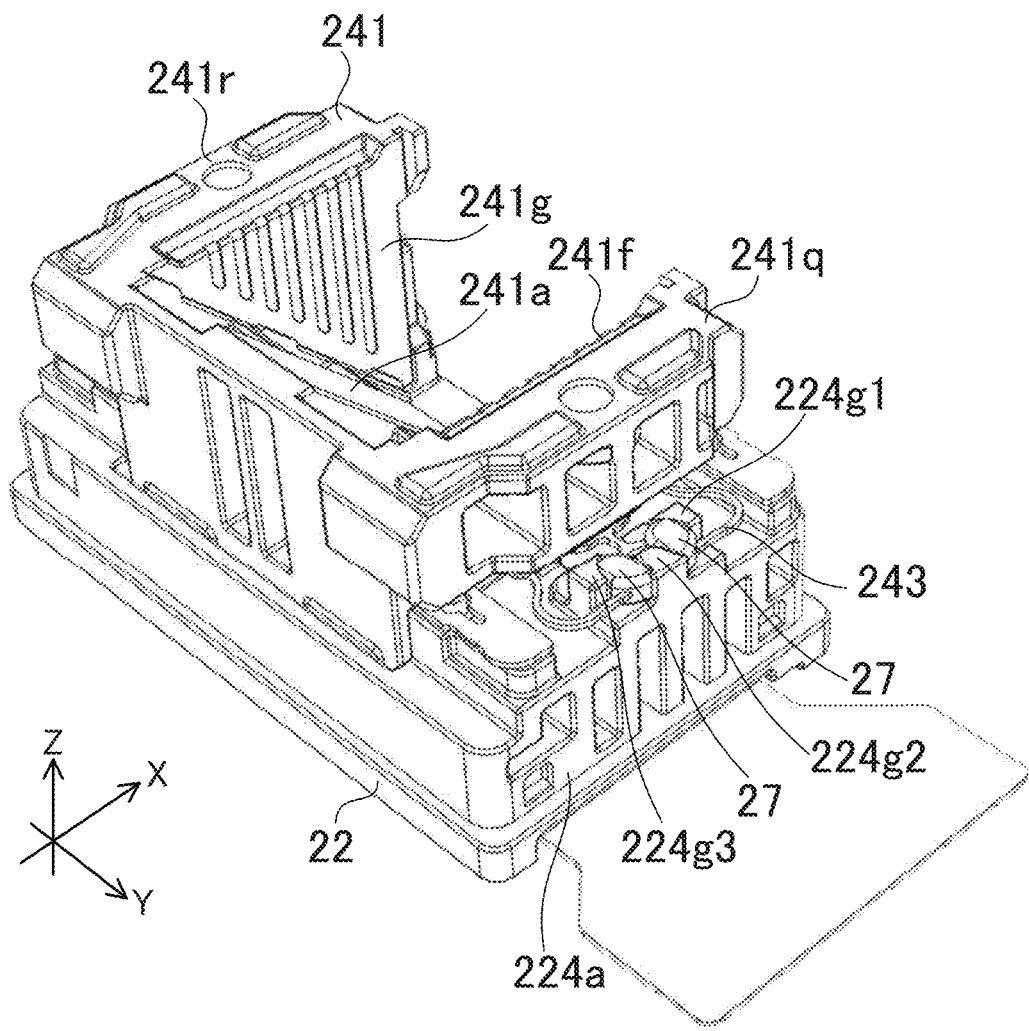
FIG. 4 is a perspective view of a state in which a holder is assembled to a first base.
Figure 8:
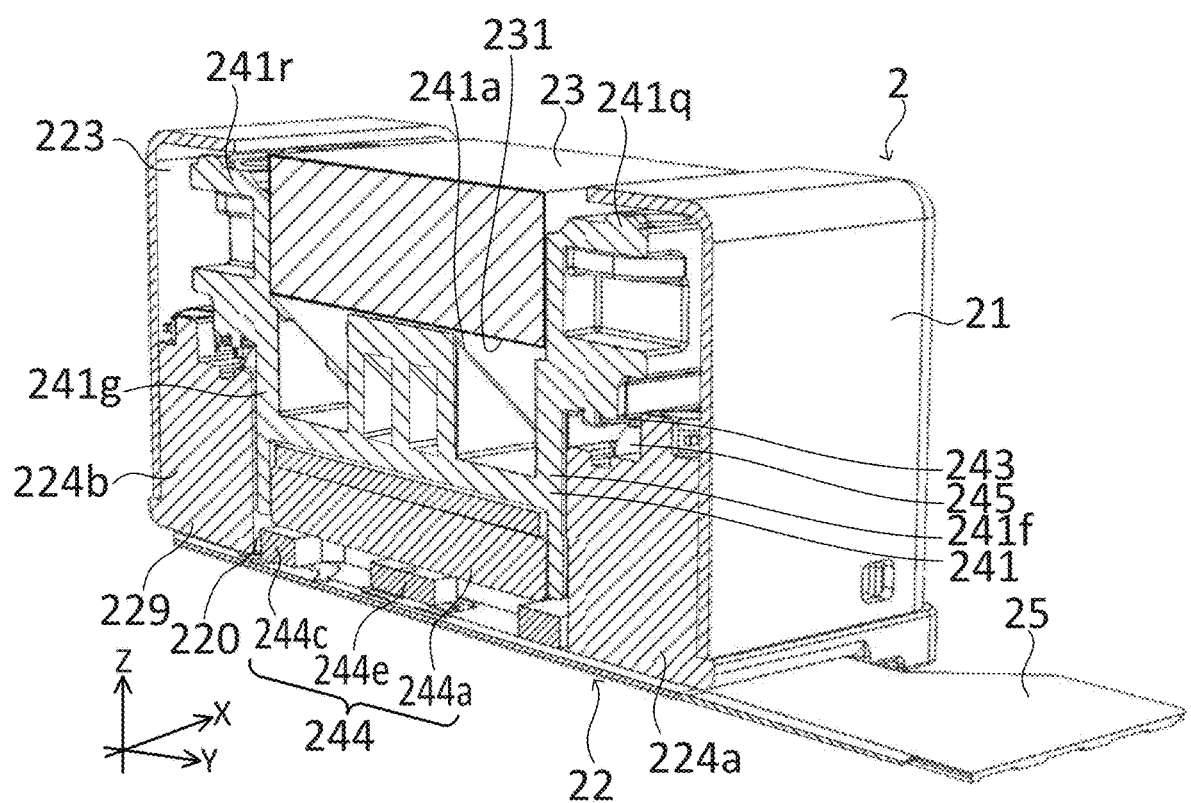
FIG. 8 is a cross-sectional view of the prism module.

First shake correction apparatus 24 will be described with reference to FIGS. 4, 5 and 8. First shake correction apparatus 24 is a driving section, swings prism 23 about the first axis parallel to the Y direction, and performs shake correction in a rotational direction about the first axis. First shake correction apparatus 24 as such is arranged in first accommodation space 223 (see FIG. 8) covered with first base 22 and first cover 21.

First shake correction apparatus 24 includes a pair of swing guide members 245, the pair of swing support springs 243, holder 241, and front-side OIS actuator 244.

In first shake correction apparatus 24, holder 241 is swingably supported on first base 22. In this state, holder 241 swings about the first axis based on a driving force of front-side OIS actuator 244. When front-side OIS actuator 244 is driven under the control by control section 5 (see FIG. 17A), holder 241 and prism 23 swing about the first axis parallel to the Y direction. Thus, shake in the rotational direction about the first axis is corrected. Hereinafter, specific structures of the respective members included in first shake correction apparatus 24 will be described.

[Swing Guide Member]

The pair of swing guide members 245 will be described with reference to FIGS. 5 and 6. Each of the pair of swing guide members 245 is, for example, a sphere made of a ceramic, a metal, or a synthetic resin. Swing guide member 245 that is one (that is, on the + side in the Y direction) of the pair of swing guide members 245 is arranged in first receiver part 225c of first base 22. On the other hand, swing guide member 245 that is the other (that is, on the − side in the Y direction) of the pair is arranged in second receiver part 225d of first base 22.

The pair of swing guide members 245 is fixed to first receiver part 225c and second receiver part 225d, respectively, with an adhesive. In this state, half parts on the + side in the Z direction of the pair of swing guide members 245 function as swing guide surfaces. The swing guide surfaces protrude toward the + side in the Z direction more than first receiver part 225c and second receiver part 225d.

Note that, swing guide member 245 is not limited to a sphere, and may be, for example, a hemisphere, a cylinder, or a half cylinder. Further, swing guide member 245 may be integrated with first base 22. That is, the swing guide member may be configured by a part of first base 22.

[Swing Support Spring]

Figure 7:
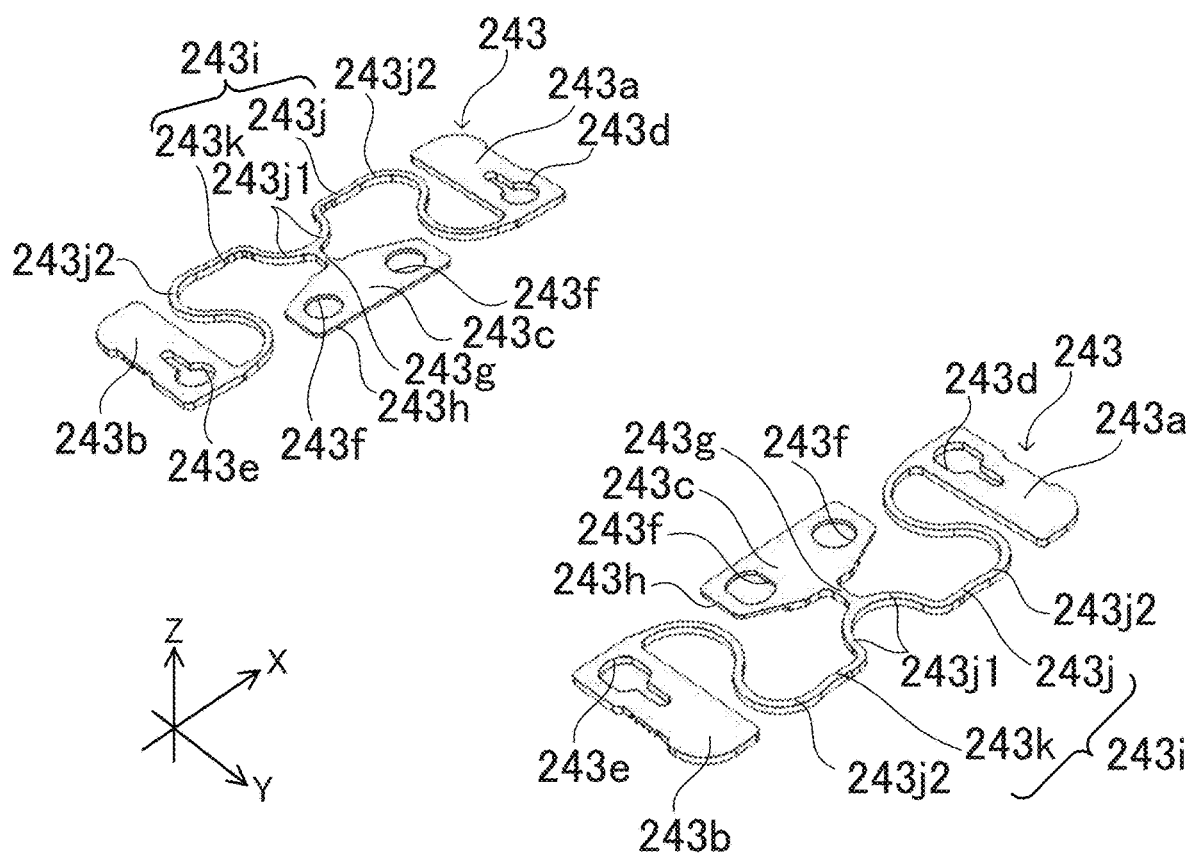
FIG. 7 is a perspective view of only swing support springs.

The pair of swing support springs 243 will be described with reference to FIG. 7. The pair of swing support springs 243 supports holder 241 to be described later to be swingable with respect to first base 22. Each of the pair of swing support springs 243 is a plate spring made of a metal and is arranged on the + side in the Z direction of the pair of swing guide members 245.

Hereinafter, swing support spring 243 that is one (that is, on the + side in the Y direction) of the pair of swing support springs 243 will be described. Swing support spring 243 that is the other (that is, on the − side in the Y direction) of the pair is symmetrical with swing support spring 243 that is the one of the pair, in the Y direction.

Swing support spring 243 that is the one of the pair includes a pair of first locking parts 243a and 243b, second locking part 243c, twist allowing part 243g, and spring-side guide surface 243h.

First locking part 243a, which is one (that is, on the + side in the X direction) of the pair of first locking parts 243a and 243b, is arranged in an end part on the + side in the X direction of swing support spring 243 that is the one of the pair. First locking part 243a as such, which is the one of the pair, includes first through-hole 243d.

On the other hand, first locking part 243b, which is the other (that is, on the − side in the X direction) of the pair, is arranged in an end part on the − side in the X direction of swing support spring 243 that is the one of the pair. First locking part 243b as such, which is the other of the pair, includes first-through hole 243e. The pair of first locking parts 243a and 243b is connected to each other by continuous part 243i extending in the X direction.

Continuous part 243i includes continuous part element 243j arranged on the + side in the X direction with respect to twist allowing part 243g to be described later and continuous part element 243k arranged on the − side in the X direction with respect to twist allowing part 243g. Continuous part element 243j connects twist allowing part 243g and first locking part 243a. On the other hand, continuous part element 243k connects twist allowing part 243g and first locking part 243b.

Hereinafter, continuous part element 243j will be described. Continuous part element 243j includes base end-side continuous part 243j1 and meandering continuous part 243j2. Base end-side continuous part 243j1 and meandering continuous part 243j2 are connected.

In continuous part element 243j, base end-side continuous part 243j1 is provided in an end part on a side close to twist allowing part 243g. One end (an end part on the side close to twist allowing part 243g) of base end-side continuous part 243j1 is connected to twist allowing part 243g.

Meandering continuous part 243j2 has a substantially S shape. One end (an end part on a side close to twist allowing part 243g) of meandering continuous part 243j2 is connected to base end-side continuous part 243j1. The other end (an end part on a side far from twist allowing part 243g) of meandering continuous part 243j2 is connected to first locking part 243a. Continuous part element 243k is symmetrical with continuous part element 243j in the X direction. For this reason, the same reference numerals as those of the constituent members of continuous part element 243j are used for continuous part element 243k, and a description thereof is omitted.

Surfaces on the − side in the Z direction of the pair of first locking parts 243a and 243b are bonded and fixed to an end surface on the + side in the Z direction of first side wall part 224a of first base 22. In this state, first positioning protrusion 226 of first base 22 is inserted through first through-hole 243d, and second positioning protrusion 227 of first base 22 is inserted through first through-hole 243e (see FIG. 5).

Note that, in the case of swing support spring 243 that is the other (on the − side in the Y direction) of the pair, the surfaces on the − side in the Z direction of the pair of first locking parts 243a and 243b are bonded and fixed to an end surface on the + side in the Z direction of first side wall part 224b of first base 22.

Second locking part 243c is provided in a portion between first locking parts 243a and 243b in the X direction via gaps therebetween in the X direction. Second locking part 243c includes a pair of second through-holes 243f.

Surfaces on the + side in the Z direction of second locking parts 243c are bonded and fixed to spring seat surfaces (not illustrated) formed on rear surfaces of overhang parts 241q and 241r of holder 241 to be described later. In this state, a pair of holder-side positioning protrusions (not illustrated) formed on the rear surfaces of overhang parts 241q and 241r of holder 241 is inserted through the pair of second through-holes 243f, respectively. Note that, in the case of swing support spring 243 that is the other (on the − side in the Y direction) of the pair, the surface on the + side in the Z direction of second locking part 243c is bonded and fixed to the spring seat surfaces (not illustrated) formed on the rear surfaces of overhang parts 241q and 241r of holder 241.

Twist allowing part 243g is a plate-like member extending in the Y direction, and connects an intermediate part (specifically, one end of each base end-side continuous part 243j1) in the X direction of continuous part 243i and second locking part 243c. By being twisted, twist allowing part 243g as such allows second locking part 243c to twist with respect to first locking parts 243a and 243b.

Further, by elastic deformation, twist allowing part 243g allows relative displacement of each of first locking parts 243a and 243b and second locking part 243c in the Z direction.

Spring-side guide surface 243h is formed by a rear surface (that is, a surface on the − side in the Z direction) of second locking part 243c. Spring-side guide surface 243h as such abuts on the swing guide surface of swing guide member 245 described above.

The pair of swing support springs 243 is plate-like members that are entirely flat in a free state (also referred to as non-assembled state). On the other hand, in the assembled state, second locking part 243c in the pair of swing support springs 243 is arranged on the + side in the Z direction with respect to first locking parts 243a and 243b based on the elastic deformation of twist allowing part 243g.

Specifically, in the assembled state, twist allowing part 243g elastically deforms so as to be directed more toward the + side in the Z direction as twist allowing part 243g is directed more toward second locking part 243c. Based on such elastic deformation, spring-side guide surfaces 243h of the pair of swing support springs 243 urge swing guide member 245 toward the − side in the Z direction.

In the assembled state of the pair of swing support springs 243 as described above, base end-side continuous parts 243j1 of the pair of swing support springs 243 are arranged in spring arrangement spaces 224e1 and 224e2 and spring arrangement spaces 224f1 and 224f2, respectively. Further, damping members 27 that are gel-like are arranged in spring arrangement spaces 224e1 and 224e2 and spring arrangement spaces 224f1 and 224f2 so as to cover base end-side continuous parts 243j1 (see FIGS. 5, 6 and 7).

Damping member 27 is effective in suppressing resonance of the pair of swing support springs 243. From the viewpoint of suppressing resonance, damping member 27 is preferably provided near a portion, which deforms the most during use, of the pair of swing support springs 243. The portion that deforms the most during use is twist allowing part 243g. For this reason, damping members 27 preferably cover portions, which are close to twist allowing parts 243g, of the pair of swing support springs 243.

[Holder]

Holder 241 will be described with reference to FIGS. 4 and 8. Holder 241 is made of, for example, a synthetic resin and holds prism 23 in a state of being swingable with respect to first base 22.

Holder 241 includes mounting surface 241a, a pair of opposing wall parts 241f and 241g, and a pair of overhang parts 241q and 241r.

Mounting surface 241a faces the rear side (the − side in the Z direction) of optical path bending surface 231 of prism 23. Mounting surface 241a includes, for example, a surface parallel to optical path bending surface 231. Note that, the structure of mounting surface 241a is not limited to that of the present embodiment, and mounting surface 241a may be a boss having a shape that enables positioning of prism 23, for example.

Each of the pair of opposing wall parts 241f and 241g is a plate-like member parallel to the XZ plane, and is arranged in a state of being separated from each other in the Y direction. The pair of opposing wall parts 241f and 241g as such is arranged to sandwich mounting surface 241a from the Y direction.

The pair of overhang parts 241q and 241r is provided in the pair of opposing wall parts 241f and 241g, respectively. Each of the pair of overhang parts 241q and 241r as such supports holder 241 to be swingable with respect to first base 22.

Specifically, on the + side surface in the Y direction of opposing wall part 241f, overhang part 241q, which is one (that is, on the + side in the Y direction) of the pair, overhangs on the + side in the Y direction from the above side surface.

On the − side surface in the Y direction of opposing wall part 241g, on the other hand, overhang part 241r, which is the other (that is, on the − side in the Y direction) of the pair, overhangs on the − side in the Y direction from the above side surface. Further, each of the pair of overhang parts 241q and 241r includes the spring seat surface (not illustrated) having a flat surface shape on the rear surface (that is, the surface on the − side in the Z direction). The spring seat surface includes the pair of holder-side positioning protrusions (not illustrated) protruding on the − side in the Z direction at two points separated from each other in the X direction.

The surfaces on the + side in the Z direction of second locking parts 243c of the pair of swing support springs 243 are bonded and fixed to the spring seat surfaces, respectively. In this state, the pair of holder-side positioning protrusions is inserted through the pair of second through-holes 243f of swing support spring 243, respectively. With this structure, holder 241 is supported to be swingable with respect to first base 22.

Note that, outer end parts in the Y direction of overhang parts 241q and 241r of holder 241 are located on center sides in the Y direction rather than the both end surfaces in the Y direction of first base 22. Such a configuration contributes to a reduction in the size and weight of holder 241.

[Front-Side OIS Actuator]

Front-side OIS actuator 244 that is an optical path bending member driving actuator will be described with reference to FIGS. 5 and 8. Front-side OIS actuator 244 swings holder 241 about the first axis. The first axis is an axis parallel to the Y direction. Specifically, the first axis is an axis parallel to the Y axis that passes through abutting parts between the swing guide surfaces of the pair of swing guide members 245 and spring-side guide surfaces 243h of the pair of swing support springs 243.

Front-side OIS actuator 244 is arranged on the rear sides (that is, on the − side in the Z direction) of prism 23 and holder 241 so as to overlap optical path bending surface 231 of prism 23 and holder 241 in the Z direction (that is, a direction of the first optical axis). Front-side OIS actuator 244 includes first magnet 244a, first coil 244c, and first Hall element 244e.

First magnet 244a is fixed to a rear side surface (that is, a surface on the − side in the Z direction) of holder 241 that is a movable-side member. First magnet 244a is composed of two magnet elements adjacent in the X direction. These respective magnet elements are magnetized in the Z direction and include one magnetic pole on one side. The directions of the magnetic poles of the respective magnet elements are opposite to each other.

First coil 244c and first Hall element 244e are fixed to a front surface (that is, a surface on the + side in the Z direction) of flexible printed circuit board (hereinafter, referred to as FPC) 25 fixed to a rear side surface of first base 22.

First coil 244c and first Hall element 244e are arranged in base-side opening 220 of first base 22. Note that, first coil 244c is a so-called air-core coil having an oval shape. First Hall element 244e is arranged on the inner side in the radial direction of first coil 244c.

Figure 17A:
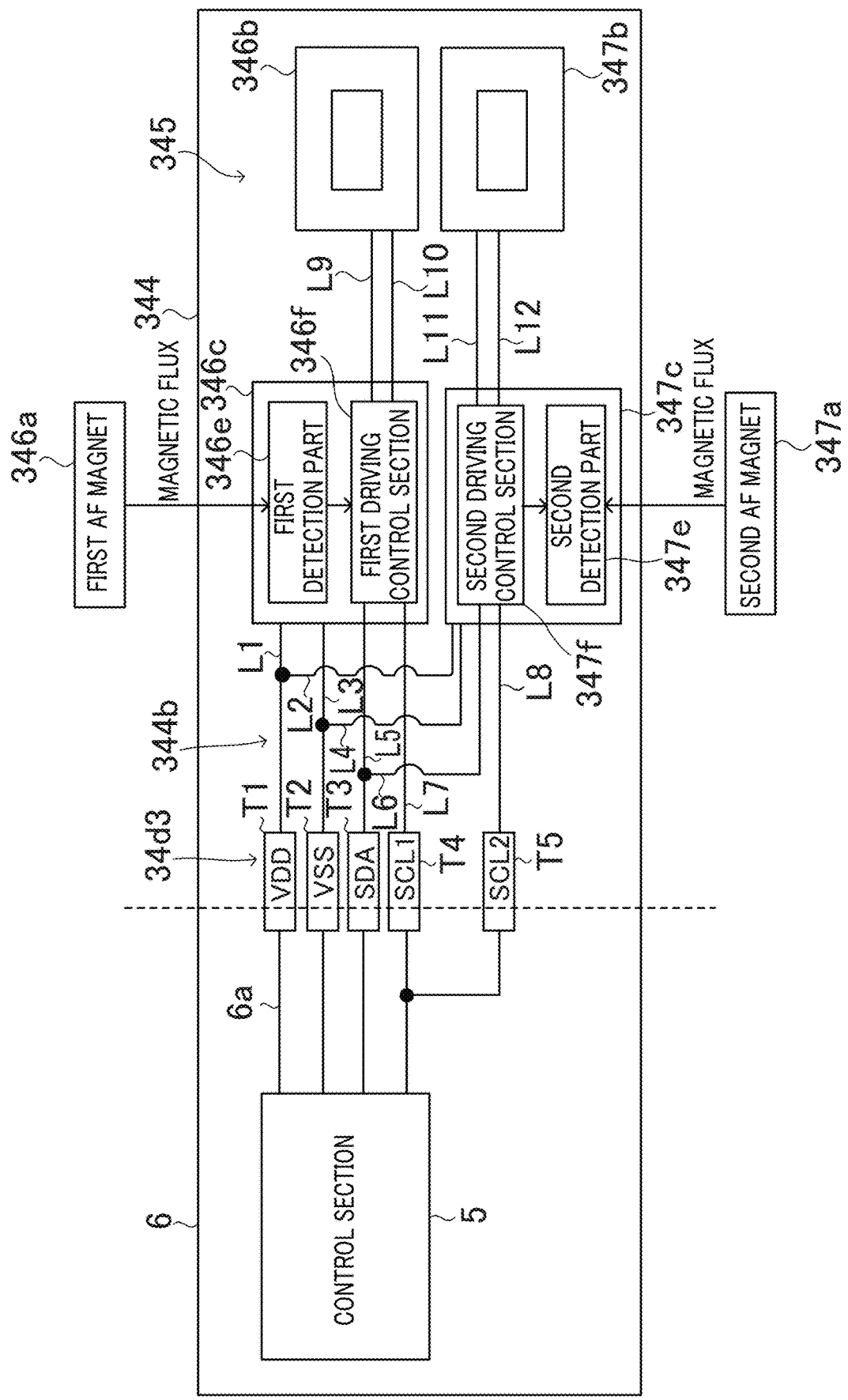
FIG. 17A is a circuit diagram of an AF driving control circuit.

Front-side OIS actuator 244 having the configuration as described above swings holder 241 about the first axis under the control by control section 5 (see FIG. 17A).

Next, lens module 3 will be described with reference to FIGS. 1 and 9A to 23B.

[Lens Module]

Lens module 3 includes second cover 31, second base 32, lens part 33, AF apparatus 34, and second shake correction apparatus 35.

[Second Cover]

Figure 9A:
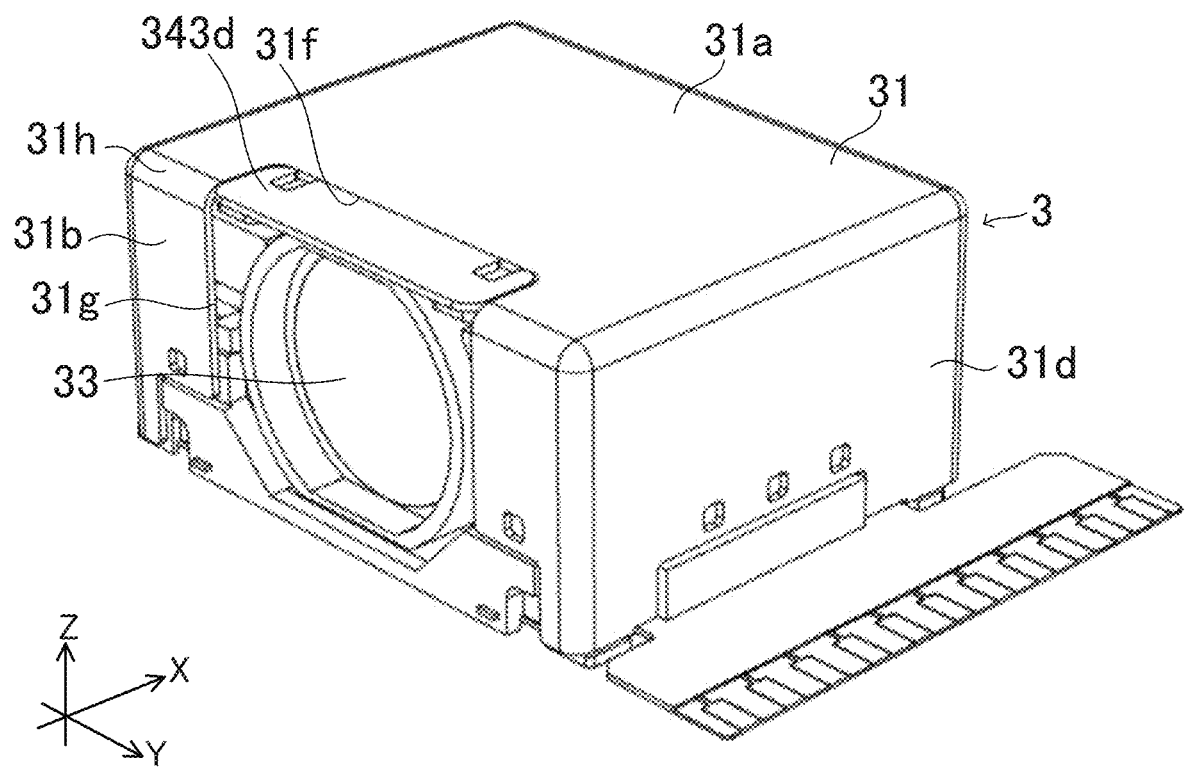
FIG. 9A is a perspective view of a lens module.
Figure 9B:
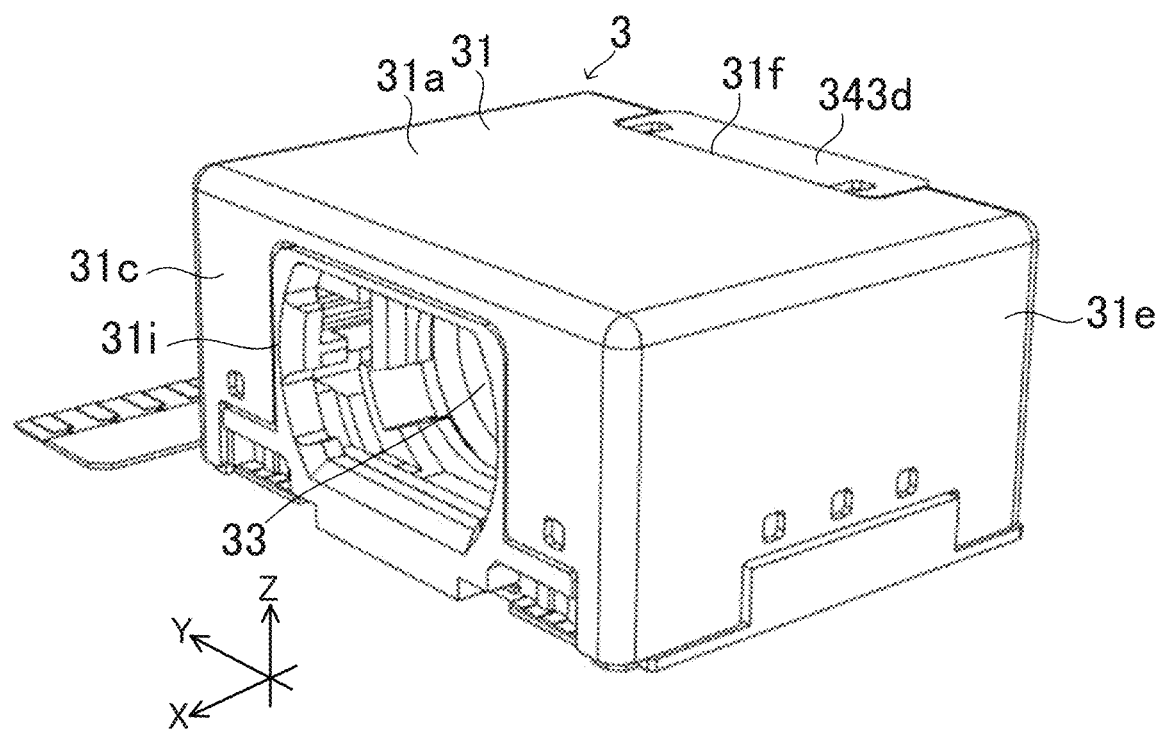
FIG. 9B is a perspective view of the lens module viewed from an angle different from that in FIG. 9A.

Second cover 31 will be described with reference to FIGS. 1, 9A and 9B. Second cover 31 is a box-shaped member that is made of, for example, a synthetic resin or a nonmagnetic metal, and is open on the both sides in the X direction and on the − side (that is, the rear side) in the Z direction.

Specifically, second cover 31 includes top plate part 31a, front plate part 31b, rear plate part 31c, first side plate part 31d, and second side plate part 31e.

Top plate part 31a is a plate member having a rectangular shape. Top plate part 31a as such is arranged on the + side in the Z direction of second cover 31. Top plate part 31a includes cutout part 31f in one end part in the X direction (the one end part is an end part on a side of prism module 2 (see FIG. 1) and on the − side in the X direction).

Cutout part 31f is cut out from an end part on the − side in the X direction of top plate part 31a toward the + side in the X direction. Cutout part 31f as such has a rectangular shape that is long in the Y direction in plan view. Connection member 343d to be described later is arranged in cutout part 31f.

Front plate part 31b is a plate-like member having a rectangular shape, and extends on the − side in the Z direction from the end part on the − side in the X direction of top plate part 31a. Front plate part 31b includes front-side opening 31g in a portion including a central part of front plate part 31b. Front-side opening 31g has a size that allows an end surface on the − side in the X direction of lens part 33 to be exposed on the − side in the X direction. Light from prism module 2 passes through front-side opening 31g and enters lens part 33.

Further, front-side opening 31g is continuous with cutout part 31f of top plate part 31a. Accordingly, an edge part on the + side in the Z direction of front-side opening 31g is not present in corner part 31h formed by top plate part 31a and front plate part 31b. Such a configuration makes it possible to facilitate processing of front-side opening 31g.

Rear plate part 31c is a plate-like member having a rectangular shape, and extends on the − side in the Z direction from an end part on the + side in the X direction of top plate part 31a. Rear plate part 31c includes rear-side opening 31i in a portion including a central part of rear plate part 31c. Rear-side opening 31i has a size that allows an end surface on the + side in the X direction of lens part 33 to be exposed on the + side in the X direction. Light from lens part 33 passes through rear-side opening 31i and enters imaging element module 4.

First side plate part 31d is a plate-like member having a rectangular shape, and extends on the − side in the Z direction from an end part on the + side in the Y direction of top plate part 31a. Further, second side plate part 31e is a plate-like member having a rectangular shape, and extends on the − side in the Z direction from an end part on the − side in the Y direction of top plate part 31a. Second cover 31 as described above is combined with second base 32 to be described later from the + side in the Z direction.

[Second Base]

Second base 32 will be described with reference to FIGS. 9C, 10 and 18 to 22. Second base 32 is combined with second cover 31 described above, thereby forming second accommodation space 32c (see FIG. 1) in which lens part 33, AF apparatus 34, and second shake correction apparatus 35 can be arranged.

Second base 32 is formed by a combination of lower-side base element 32a and upper-side base element 32b.

Second base 32 includes bottom part 32d and a pair of second side wall parts 32g and 32h. Bottom part 32d includes a base made of a synthetic resin and reinforcing plate 32k made of a metal and insert-molded on the base. Reinforcing plate 32k as such contributes to an increase in the rigidity of bottom part 32d and a decrease in the thickness of bottom part 32d.

On the − side in the Z direction with respect to lens guide 341 to be described later, reinforcing plate 32k of second base 32 is arranged so as to overlap lens guide 341. Specifically, lens guide 341 is present on the + side in Z direction of reinforcing plate 32k, at whichever position lens guide 341 is present in a range in which lens guide 341 is movable during autofocus operation (that is, a range in which lens guide 341 is movable in the X direction) and in a range in which lens guide 341 is movable during shake correction operation (that is, a range in which lens guide 341 is movable in the Y direction). For this reason, a front surface (that is, a surface on the + side in the Z direction) of reinforcing plate 32k is always covered with lens guide 341 and is not exposed. Accordingly, light reflected by reinforcing plate 32k is prevented from entering lens part 33 and further an imaging element of imaging element module 4 to be described later.

Figure 21:
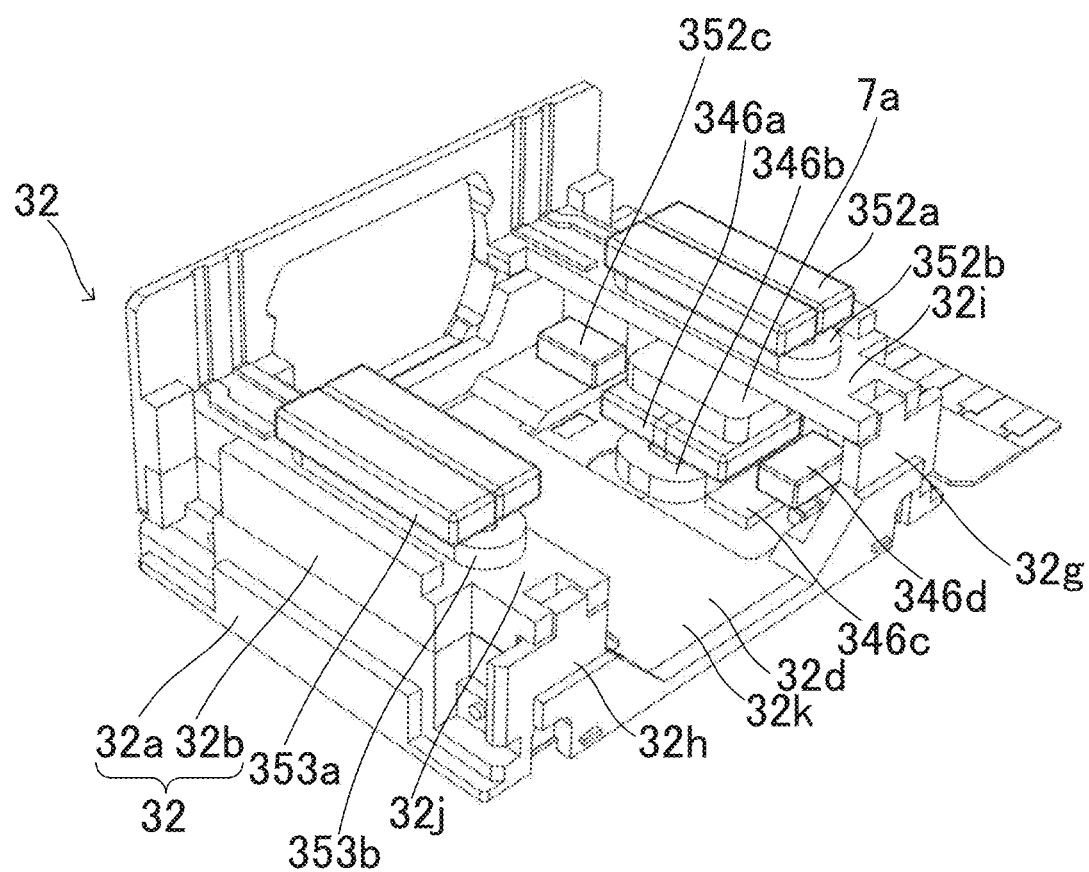
FIG. 21 is a perspective view of the second base, the AF actuator, and the rear-side OIS actuator.
Figure 22:
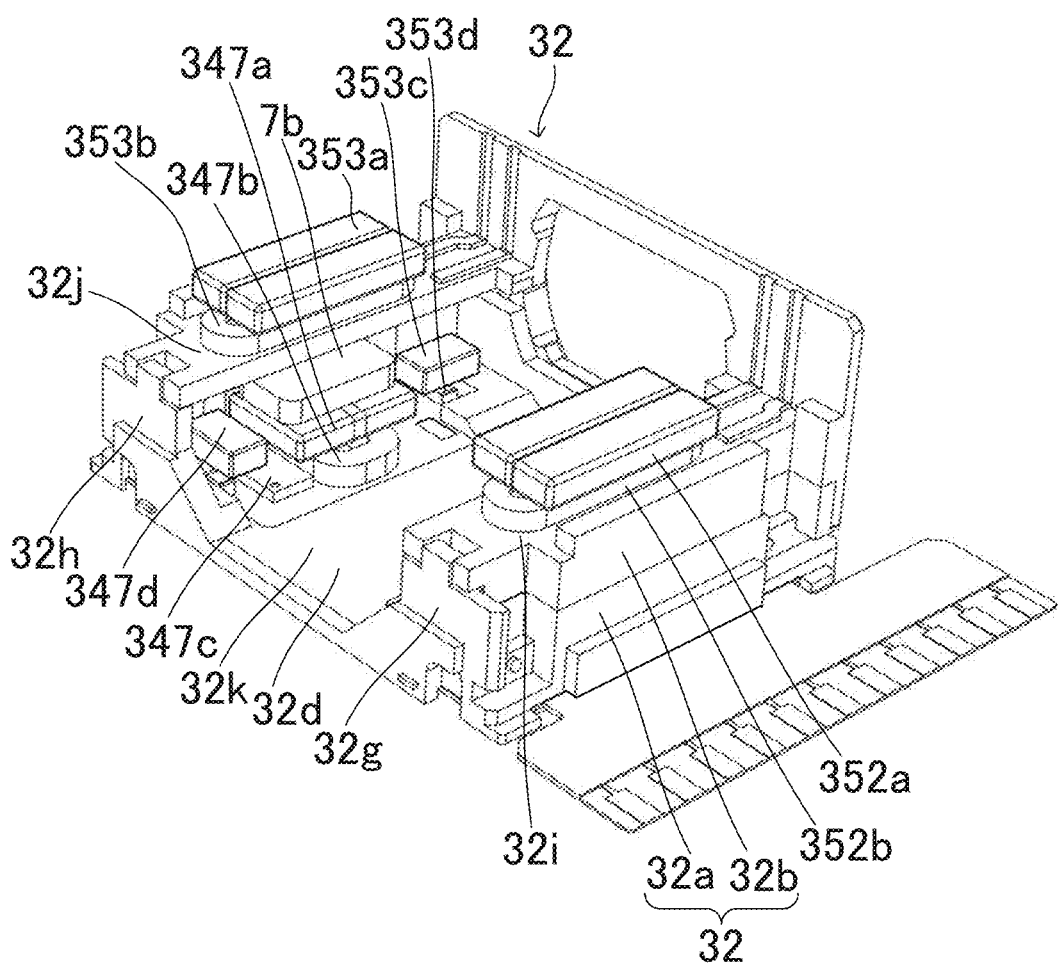
FIG. 22 is a perspective view of the second base, the AF actuator, and the rear-side OIS actuator viewed from an angle different from that in FIG. 21.

Second base 32 includes bottom through-holes 32e and 32f (see FIGS. 18 and 19) in respective parts on both sides in the Y direction of reinforcing plate 32k in bottom part 32d. As illustrated in FIGS. 21 and 22, first AF coil 346b and second AF coil 347b of AF actuator 345 to be described later are arranged in bottom through-holes 32e and 32f, respectively.

Figure 20:
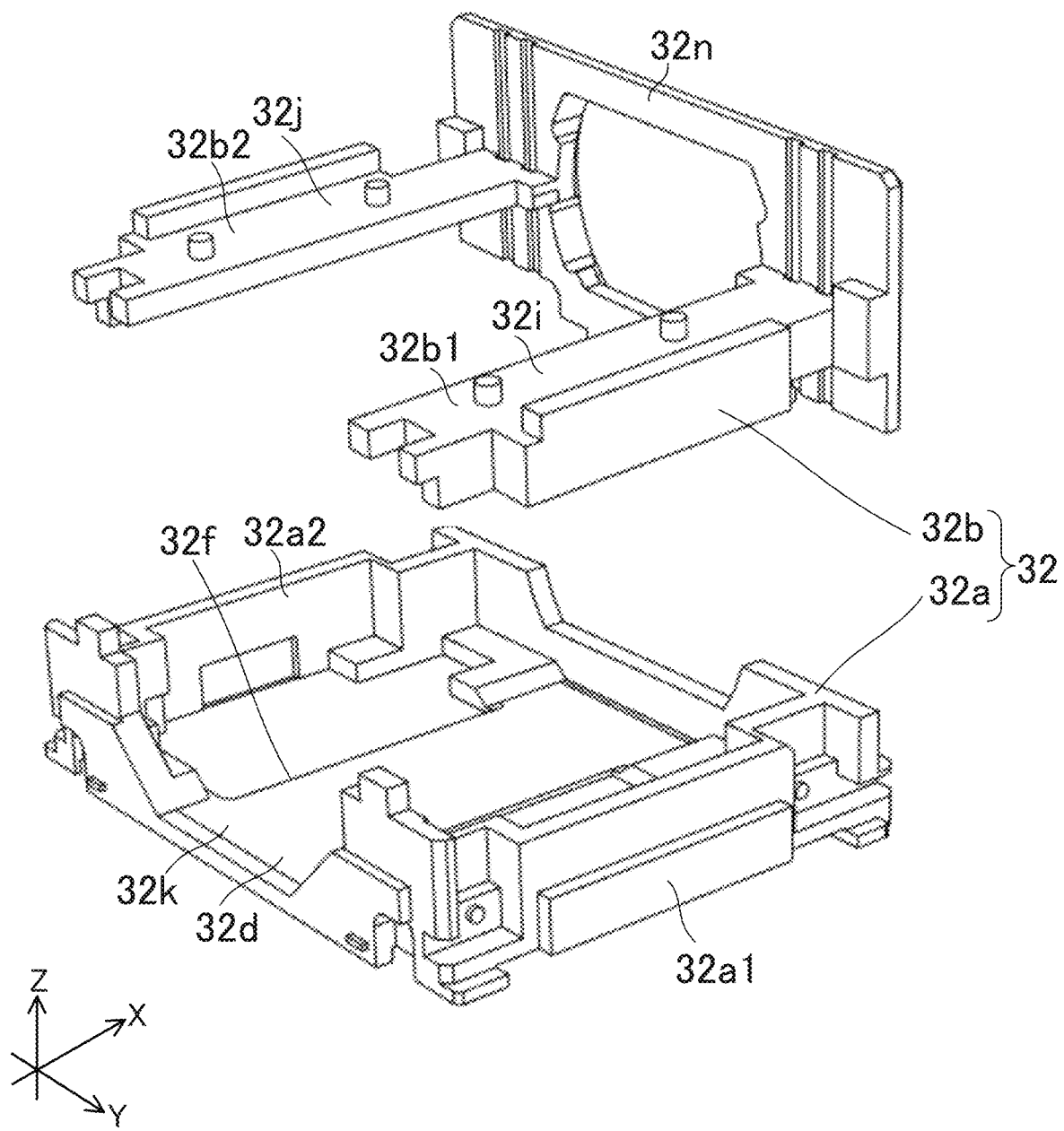
FIG. 20 is an exploded perspective view of the second base.

Each of second side wall parts 32g and 32h extends on the + side in the Z direction from both end parts in the Y direction of bottom part 32d. In the case of the present embodiment, as illustrated in FIG. 20, second side wall part 32g is formed by a combination of second lower wall element 32a1 of lower-side base element 32a and second upper wall element 32b1 of upper-side base element 32b. Further, second side wall part 32h is formed by a combination of second lower wall element 32a2 of lower-side base element 32a and second upper wall element 32b2 of upper-side base element 32b.

As illustrated in FIGS. 21 and 22, second side wall parts 32g and 32h include coil mount parts 32i and 32j, respectively. On respective coil mount parts 32i and 32j as such, first OIS coil 352b and second OIS coil 353b of second shake correction apparatus 35 to be described later are mounted. In the case of the present embodiment, coil mount parts 32i and 32j are provided on upper surfaces of second upper wall elements 32b1 and 32b2 of upper-side base element 32b.

Coil mount part 32i is arranged between first overhang part 34a1 and second overhang part 34a3 of lens guide 341 in the Z direction. Further, coil mount part 32j is arranged between first overhang part 34a2 and second overhang part 34a4 of lens guide 341 in the Z direction.

Further, as illustrated in FIG. 21, first AF magnet 346a of AF actuator 345 to be described later are arranged between coil mount part 32i and bottom part 32d. Further, as illustrated in FIG. 22, second AF magnet 347a of AF actuator 345 is arranged between coil mount part 32j and bottom part 32d. First AF magnet 346a and second AF magnet 347a are held by lens guide 341 to be described later.

In the case of the present embodiment, bottom through-holes 32e and 32f and coil mount parts 32i and 32j overlap each other with prescribed gaps therebetween in the Z direction. Accordingly, first AF coil 346b and second AF coil 347b arranged in bottom through-holes 32e and 32f and first OIS coil 352b and second OIS coil 353b mounted on coil mount parts 32i and 32j overlap each other with prescribed gaps therebetween in the Z direction.

Further, second side wall part 32g includes, in both end parts in the X direction on a side surface on the + side in the Y direction, spring arrangement parts 32m1 and 32m3 (see FIG. 9C) for arranging springs 342a1 and 342a3 to be described later. On the other hand, second side wall part 32h includes, in both end parts in the X direction on a side surface on the − side in the Y direction, spring arrangement parts 32m2 and 32m4 (see FIG. 10) for arranging springs 342a2 and 342a4 to be described later.

Further, second base 32 includes reference part 32n in an end part on the + side in the X direction. Reference part 32n is a plate-like member provided in the end part on the + side in the X direction of second base 32. A side surface on the + side in the X direction of reference part 32n as such serves as a reference surface in the X direction of imaging element module 4 to be described later. On the other hand, reference part 32n includes, on a side surface on the − side in the X direction, first reference surface 32n1 (see FIG. 23B) that serves as a reference surface in the X direction of lens guide 341 to be described later. First reference surface 32n1 as such also serves as a reference during calibration to be described later. Reference part 32n includes in a central part a through-hole through which light having passed through lens part 33 is guided to imaging element module 4. Reference part 32n as such is a member for positioning imaging element module 4.

[Lens Part]

Lens part 33 is arranged in second accommodation space 32c (see FIG. 1), in a state in which lens part 33 is held by lens guide 341 to be described later. Lens part 33 as such includes, as illustrated in FIGS. 9C to 12, lens barrel 33A having a cylindrical shape and one or more lenses 33B held by lens barrel 33A. As an example, lens part 33 includes a 3x or more optical telephoto lens group, for example, which is fixed between an end part on the − side in the X direction of lens barrel 33A and an end part on the + side in the X direction of lens barrel 33A. Note that, the structure of lens part 33 is not limited to the aforementioned structure.

[AF Apparatus]

AF apparatus 34 will be described with reference to FIGS. 9C to 17A. AF apparatus 34 is a driving section and displaces lens part 33 in the X direction for the purpose of autofocusing. Specifically, AF apparatus 34 includes lens guide 341, first support mechanism 342, second support mechanism 343, FPC 344, and AF actuator 345.

[Lens Guide]

Figure 11:
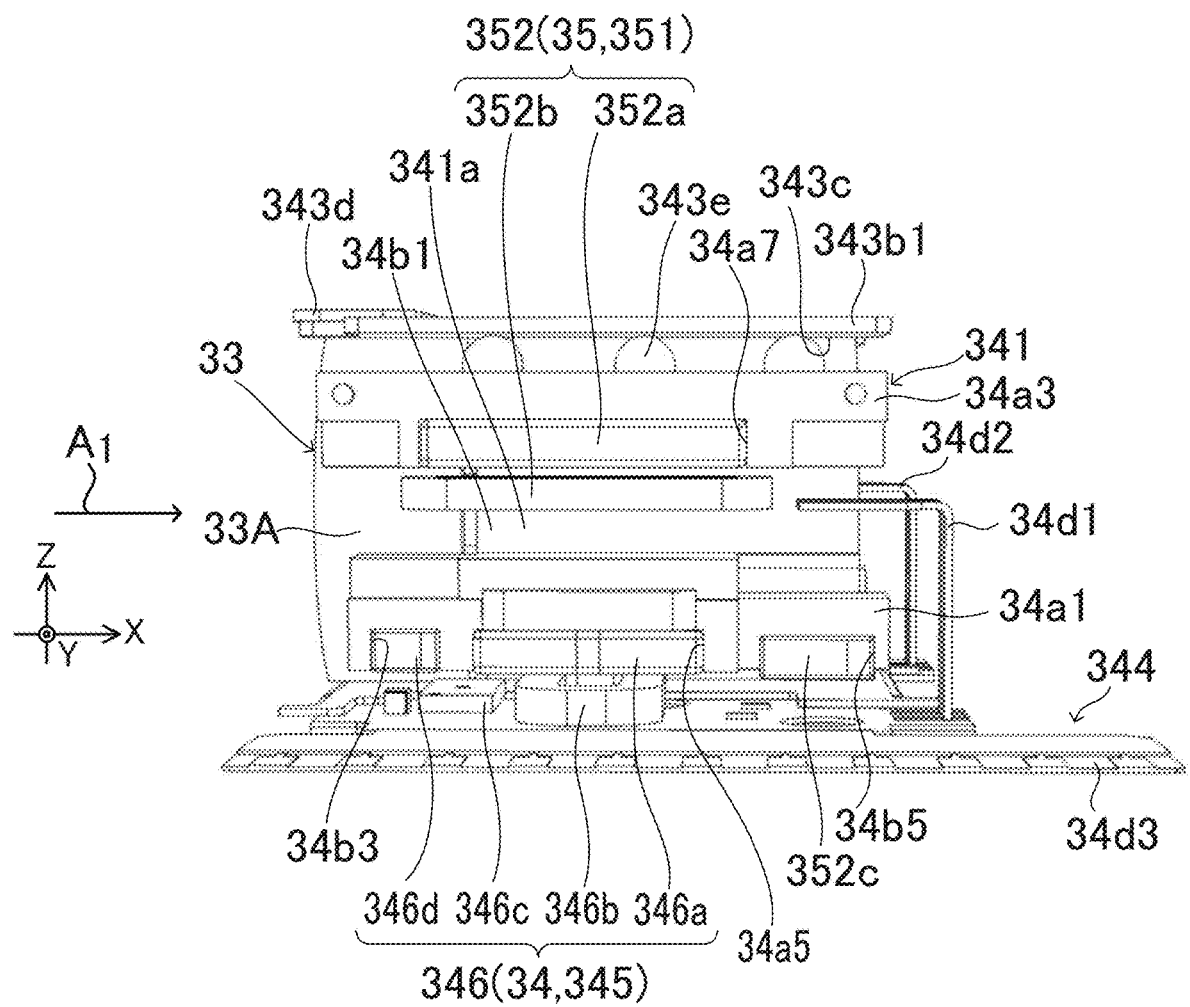
FIG. 11 is a side view of the lens module from which a second base is omitted.
Figure 12:
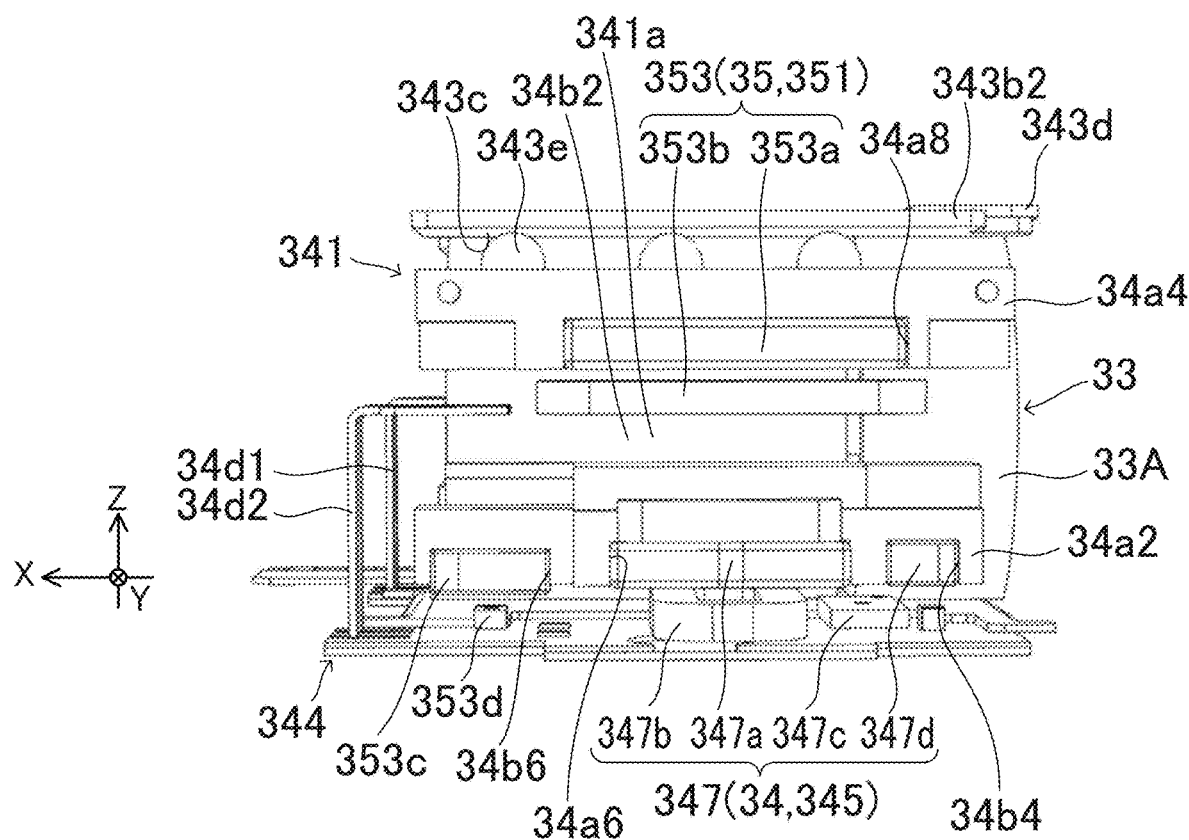
FIG. 12 is a side view of the lens module from which the second base is omitted, in a state in which the lens module is viewed from a side opposite to that in FIG. 11.
Figure 13:
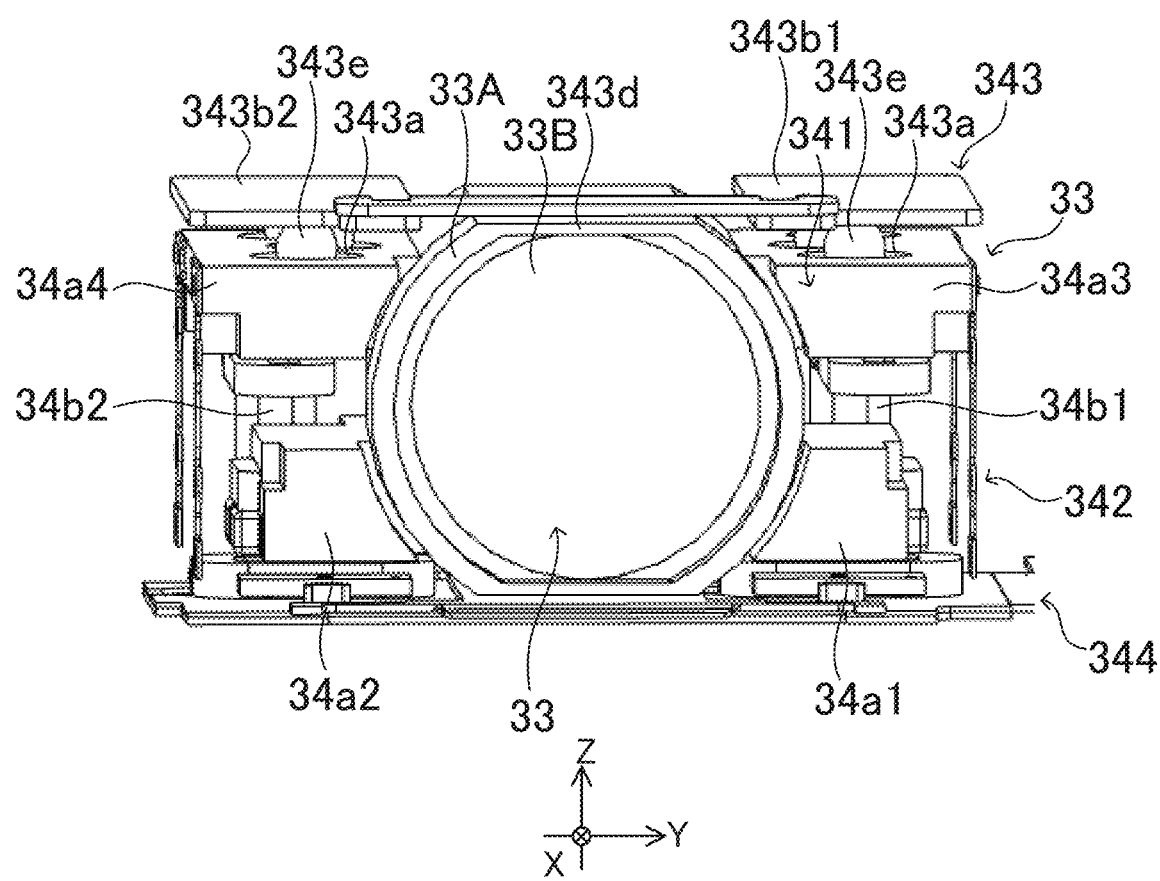
FIG. 13 illustrates the lens module from which some members are omitted, viewed from a direction of arrow Ai of FIG. 11.

Lens guide 341 will be described with reference to FIGS. 11 to 13. FIG. 11 illustrates lens module 3 in a state in which some members are omitted from lens module 3, viewed from the + side in the Y direction. FIG. 12 illustrates lens module 3 in a state in which some members are omitted from lens module 3, viewed from the − side in the Y direction. FIG. 13 illustrates lens module 3 in a state in which second base 32 is omitted from lens module 3, viewed from the − side in the X direction.

Lens guide 341 includes lens holding part 341a having a cylindrical shape, a pair of first overhang parts 34a1 and 34a2, and a pair of second overhang parts 34a3 and 34a4. Lens guide 341 as such is arranged in second accommodation space 32c, in a state in which lens guide 341 is displaceable in the X direction (that is, a direction of the second optical axis) and in the Y direction.

Lens holding part 341a includes an accommodation space capable of holding lens barrel 33A therein.

Each of the pair of first overhang parts 34a1 and 34a2 is provided in a state of extending in directions opposite to each other in the Y-axis direction from two points on an outer peripheral surface of lens holding part 341a having a cylindrical shape.

Each of the pair of second overhang parts 34a3 and 34a4 is provided in a state of extending in directions opposite to each other in the Y-axis direction from two points on the + side in the Z direction with respect to the pair of first overhang parts 34a1 and 34a2, on the outer peripheral surface of lens holding part 341a having a cylindrical shape.

First overhang part 34a1 that is one (on the + side in the Y direction) of the pair of first overhang parts 34a1 and 34a2 and second overhang part 34a3 that is one (on the + side in the Y direction) of the pair of second overhang parts 34a3 and 34a4 overlap each other via space 34b1 in the Z direction. First overhang part 34a2 that is the other (on the − side in the Y direction) of the pair of first overhang parts 34a1 and 34a2 and second overhang part 34a4 that is the other (on the − side in the Y direction) of the pair of second overhang parts 34a3 and 34a4 overlap each other via space 34b2 in the Z direction.

Lens guide 341 includes first magnet holding part 34a5 (see FIG. 11) that holds first AF magnet 346a of AF actuator 345 to be described later, and first magnet holding part 34a6 (see FIG. 12) that holds second AF magnet 347a of AF actuator 345 to be described later. Specifically, first magnet holding parts 34a5 and 34a6 are provided in the pair of first overhang parts 34a1 and 34a2, respectively.

Each of first magnet holding parts 34a5 and 34a6 is a recess that is open on the − side in the Z direction. First magnet holding parts 34a5 and 34a6 as such are arranged on the − side in the Z direction of the pair of coil mount parts 32i and 32j (see FIGS. 21 and 22) of second base 32. Further, the pair of first magnet holding parts 34a5 and 34a6 as such and bottom through-holes 32e and 32f of second base 32 are provided on the same straight line parallel to the Z direction. The pair of first magnet holding parts 34a5 and 34a6 is provided on the + side in the Z direction with respect to bottom through-holes 32e and 32f.

Lens guide 341 includes second magnet holding part 34a7 (see FIG. 11) that holds first OIS magnet 352a of rear-side OIS actuator 351 to be described later. Further, lens guide 341 includes second magnet holding part 34a8 (see FIG. 12) that holds second OIS magnet 353a of rear-side OIS actuator 351. Specifically, second magnet holding parts 34a7 and 34a8 are provided in the pair of second overhang parts 34a3 and 34a4, respectively.

Each of the pair of second magnet holding parts 34a7 and 34a8 is a recess that is open on the − side in the Z direction. The pair of second magnet holding parts 34a7 and 34a8 as such as coil mount parts 32i and 32j of second base 32 are provided on the same straight line parallel to the Z direction. The pair of second magnet holding parts 34a7 and 34a8 is provided on the + side in the Z direction with respect to coil mount parts 32i and 32j.

Lens guide 341 includes third magnet holding part 34b3 (see FIG. 11) that holds first X-position detecting magnet 346d of AF actuator 345 in the vicinity of first magnet holding part 34a5. Further, lens guide 341 includes third magnet holding part 34b4 (see FIG. 12) that holds second X-position detecting magnet 347d of AF actuator 345 in the vicinity of first magnet holding part 34a6.

Specifically, each of third magnet holding parts 34b3 and 34b4 is provided, in the pair of first overhang parts 34a1 and 34a2, on the − side in the X direction with respect to first magnet holding parts 34a5 and 34a6. Note that, the positions of third magnet holding parts 34b3 and 34b4 are not limited to the positions described above as long as the positions of third magnet holding parts 34b3 and 34b4 are in the vicinity of first magnet holding parts 34a5 and 34a6.

Lens guide 341 includes a pair of fourth magnet holding parts 34b5 and 34b6 (see FIGS. 11 and 12) holding Y-position detecting magnets 352c and 353c of rear-side OIS actuator 351 in the vicinity of first magnet holding parts 34a5 and 34a6. Specifically, each of the pair of fourth magnet holding parts 34b5 and 34b6 is provided, in the pair of first overhang parts 34a1 and 34a2, on the + side in the X direction with respect to first magnet holding parts 34a5 and 34a6. Note that, the positions of the pair of fourth magnet holding part 34b5 and 34b6 are not limited to the position described above as long as the positions of the pair of fourth magnet holding part 34b5 and 34b6 are in the vicinity of first magnet holding parts 34a5 and 34a6.

Lens guide 341 includes a plurality of (six in the case of the present embodiment) ball holding parts 343a (see FIG. 10) holding a plurality of balls 343e of second support mechanism 343 to be described later. Specifically, three ball holding parts 343a described above are provided on each of surfaces on the + side in the Z direction of the pair of second overhang parts 34a3 and 34a4.

When lens guide 341 is in a state of being displaced most on the + side in the X direction, an end surface on the + side in the X direction of lens guide 341 (hereinafter, the end surface will be referred to as "lens guide-side reference surface") abuts on first reference surface 32n1 of reference part 32n.

Each of the lens guide-side reference surface of lens guide 341 and first reference surface 32n1 is a flat surface parallel to the YZ plane. Accordingly, in a state in which the lens guide-side reference surface of lens guide 341 abuts (surface contact) on first reference surface 32n1, lens guide 341 becomes a state in which lens guide 341 is not inclined in the Y direction and in the Z direction with respect to the X direction (that is, the direction of the second optical axis) (hereinafter, the state will be referred to as "reference state of lens guide 341").

[First Support Mechanism]

First support mechanism 342 will be described with reference to FIGS. 9C to 12 and 14. First support mechanism 342 elastically supports lens guide 341 on second base 32 in a state in which lens guide 341 is displaceable with respect to second base 32. First support mechanism 342 as such is also referred to as elastic support mechanism.

First support mechanism 342 includes a plurality (four in the case of the present embodiment) of springs 342a1 to 342a4 each of which is an elastic support member. Springs 342a1 to 342a4 elastically support lens guide 341 on second base 32. In this state, lens part 33 can be displaced in the X direction and the Y direction with respect to second base 32. Further, displacement of lens guide 341 in the Z direction with respect to second base 32 is regulated to a prescribed range by first support mechanism 342. The prescribed range is a range in which lens guide 341 is displaceable based on elastic deformation of springs 342a1 to 342a4.

Figure 9C:
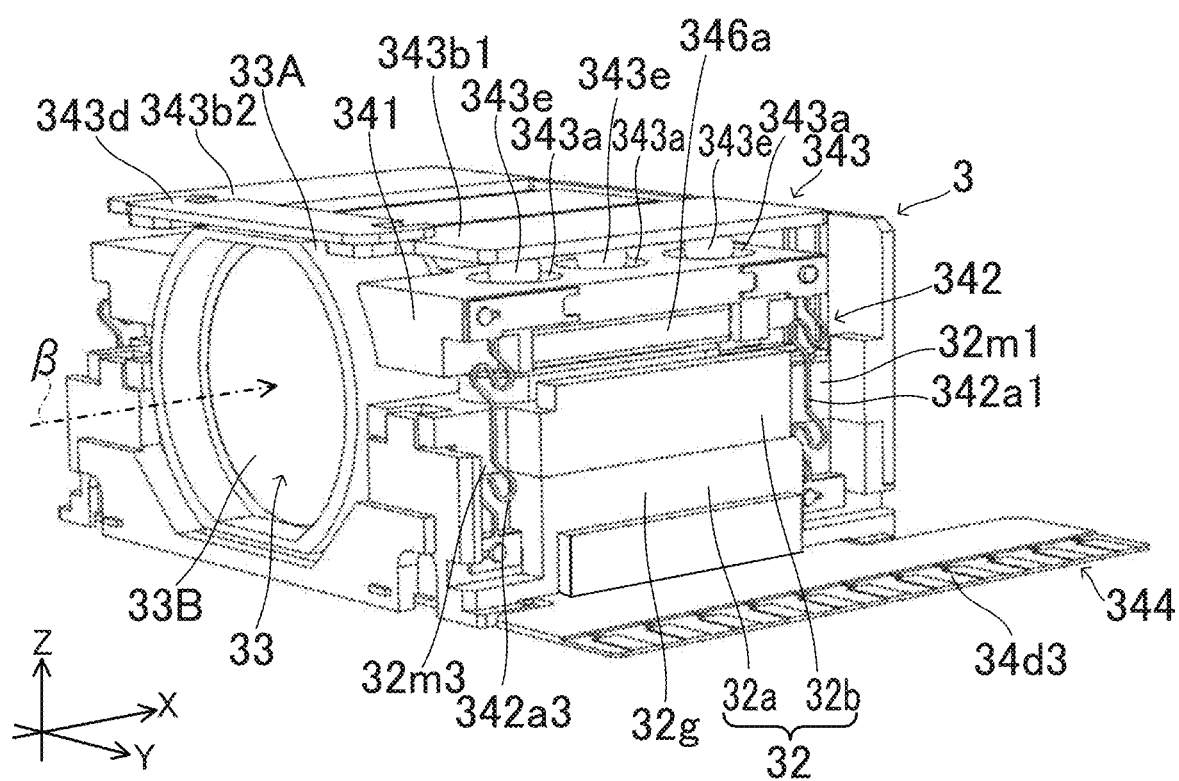
FIG. 9C is a perspective view of the lens module from which some members are omitted.

Spring 342a1 supports end parts on the + side in the X direction and on the + side in the Y direction of lens guide 341 on second base 32 (see FIG. 9C). Spring 342a2 supports end parts on the + side in the X direction and on the − side in the Y direction of lens guide 341 on second base 32 (see FIG. 10). Spring 342a3 supports end parts on the − side in the X direction and on the + side in the Y direction of lens guide 341 on second base 32 (see FIG. 9C). Furthermore, spring 342a4 supports end parts on the − side in the X direction and on the − side in the Y direction of lens guide 341 on second base 32 (see FIG. 10).

Figure 14:
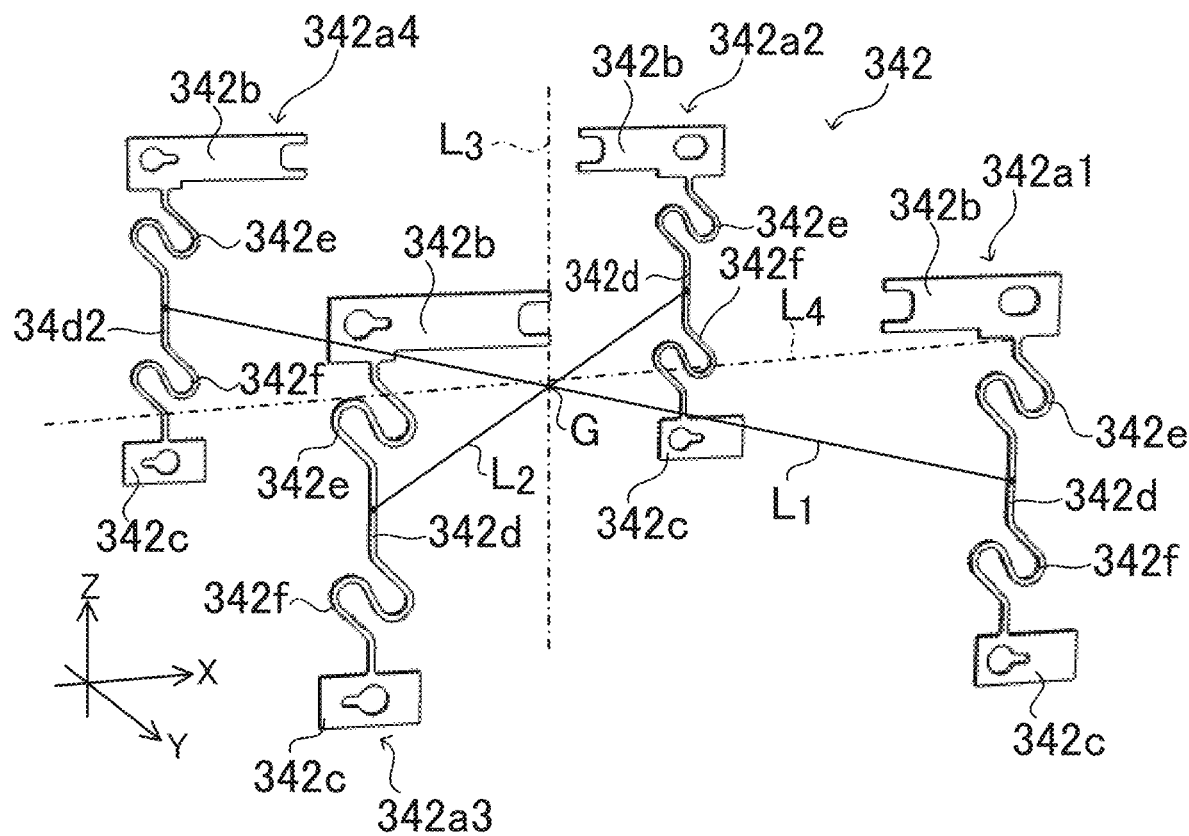
FIG. 14 is a perspective view of only springs as being arranged in an assembled state.
Figure 15:
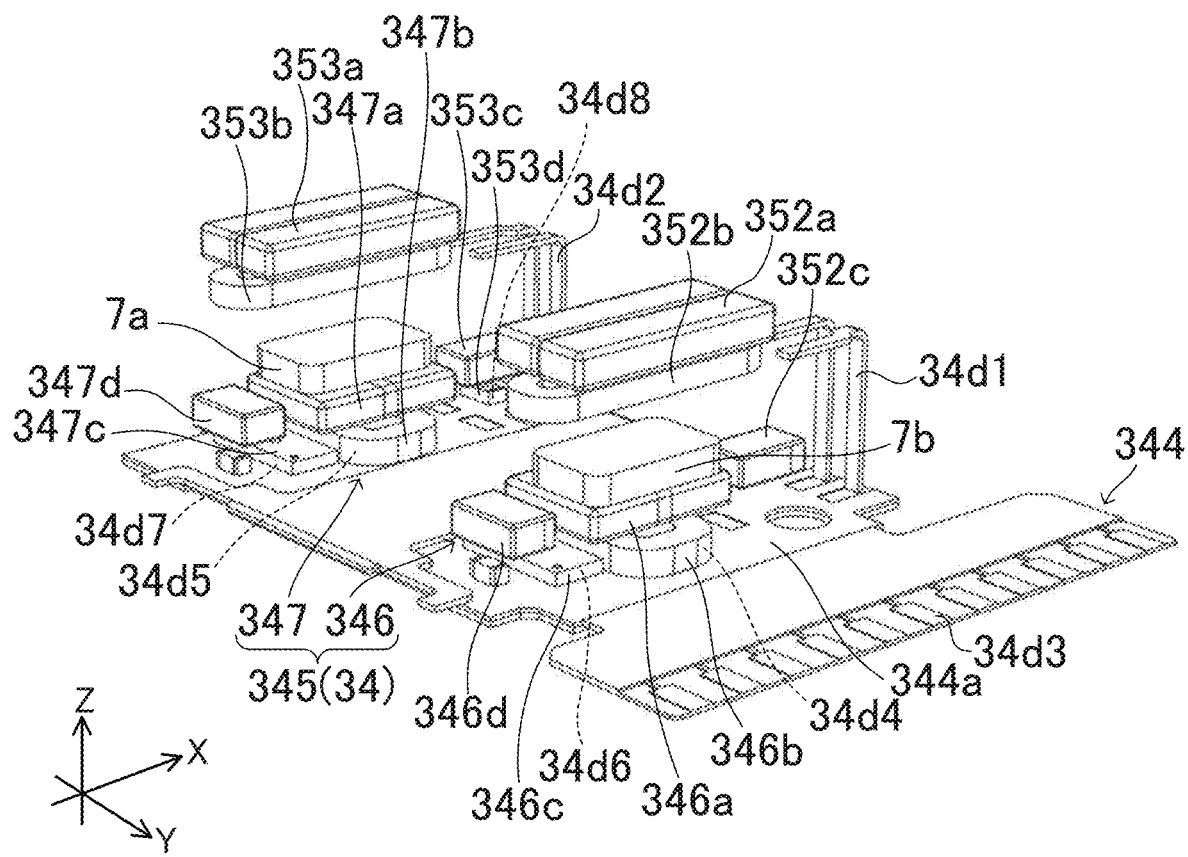
FIG. 15 is a perspective view of an FPC, an AF actuator, and a rear-side OIS actuator.

As illustrated in FIG. 14, each of springs 342a1 to 342a4 includes first fixed part 342b, second fixed part 342c, and connection part 342d. Note that, FIG. 14 illustrates springs 342a1 to 342a4 as arranged in the assembled state.

First fixed part 342b is fixed to lens guide 341 that is a movable-side member. Second fixed part 342c is fixed to second base 32 that is a fixed-side member.

Connection part 342d connects first fixed part 342b and second fixed part 342c. Connection part 342d is composed of, for example, a linear member that is at least partially curved (specifically, bent into a meandering shape and molded).

Specifically, each connection part 342d includes first bending part 342e and second bending part 342f in this order from the + side in the Z direction. Each of springs 342a1 to 342a4 as such is arranged in spring arrangement parts 32m1 to 32m4 (see FIGS. 9C and 10) of second base 32.

First bending part 342e is a portion bent in a meandering shape, and is provided in one end part (an end part on the + side in the Z direction) of connection part 342d. First bending part 342e as such elastically deforms in the length direction (the Z direction) of connection part 342d when lens part 33 is displaced in the Z direction with respect to second base 32.

Note that, the position of first bending part 342e is not limited to the position of the present embodiment. First bending part 342e is preferably provided in a half part on one side (that is, a half part on a side of first fixed part 342b) of connection part 342d. Further, first bending part 342e is more preferably provided in one end part of connection part 342d as in the present embodiment. Although illustration is omitted, each first bending part 342e may be covered with a gel-like damping member in the assembled state.

Second bending part 342f is a linear member that is provided in the other end part (an end part on the − side in the Z direction) of connection part 342d and is bent in a meandering shape. Second bending part 342f elastically deforms in the length direction (the Z direction) of connection part 342d when lens part 33 is displaced in the Z direction with respect to second base 32. The amount of displacement of second bending part 342f when lens part 33 is displaced in the Z direction with respect to second base 32 is smaller than the amount of displacement of first bending part 342e.

Further, when lens part 33 is displaced in the X direction with respect to second base 32, connection part 342d is displaced so as to swing, with the vicinity of an end part on a side of second fixed part 342c being as a fulcrum. Accordingly, the farther a portion of connection part 342d is from the fulcrum (in other words, the closer a portion of connection part 342d is to first fixed part 342b), the greater the amount of displacement is when lens part 33 is displaced in the X direction with respect to second base 32.

Note that, the position of second bending part 342f is not limited to the position of the present embodiment. Second bending part 342f is preferably provided in a half part on the other side (that is, a half part on the side of second fixed part 342c) of connection part 342d. Further, second bending part 342f is more preferably provided in the other end part of connection part 342d as in the present embodiment. Further, in the present embodiment, second bending part 342f may be omitted. That is, connection part 342d may be configured to include a bending part at only one point. Note that, although illustration is omitted, each second bending part 342f may be covered with a gel-like damping member.

In the case of the present embodiment, connection part 342d has directionality in the X direction. Springs 342a1 and 342a2 are arranged so as to be in the same direction in the X direction. In other words, springs 342a1 and 342a2 are arranged such that at least connection parts 342d overlap each other when viewed from the + side in the Y direction, for example.

Springs 342a3 and 342a4 are arranged so as to be in the same direction in the X direction. In other words, springs 342a3 and 342a4 are arranged such that at least connection parts 342d overlap each other when viewed from the + side in the Y direction, for example.

Springs 342a1 and 342a3 are arranged such that connection parts 342d face in the same direction in the X direction. Springs 342a2 and 342a4 are arranged such that connection parts 342d face in the same direction in the X direction. However, as a modification, connection parts 342d of springs 342a1 and 342a3 may have a line symmetrical relationship using the Z axis as a symmetry axis, when viewed from the Y direction. Further, connection parts 342d of springs 342a2 and 342a4 may also have a line symmetrical relationship using the Z axis as a symmetry axis, when viewed from the Y direction. Even in the case of such a modification, springs 342a1 and 342a3 are preferably arranged so as to be in the same direction in the X direction, and springs 342a2 and 342a4 are preferably arranged so as to be in the same direction in the X direction.

Further, in the case of the present embodiment, when a straight line connecting the centers of springs 342a1 and 342a4 arranged at diagonal positions of lens guide 341 is straight line $L_1$ and a straight line connecting the centers of springs 342a2 and 342a3 is straight line $L_2$ when viewed from the + side in the Z direction as illustrated in FIG. 14, for example, the intersection of straight lines $L_1$ and $L_2$ (also referred to as center position of dispersed arrangement) coincides or substantially coincides with center of gravity G of the movable-side member at a reference position to be described later.

Note that, the movable-side member is lens guide 341, and each member fixed to lens guide 341 and displaceable together with lens guide 341. Specifically, in the case of the present embodiment, the movable-side member includes e.g. lens guide 341, lens part 33, first AF magnet 346a and second AF magnet 347a of AF actuator 345, and first OIS magnet 352a and second OIS magnet 353a of rear-side OIS actuator 351.

The center of each of springs 342a1 to 342a4 is, for example, the center position in the Z direction and the center position in the X direction of each of springs 342a1 to 342a4. Further, the reference position of lens guide 341 refers to a state in which lens guide 341 is not displaced in the X direction by the autofocusing function and a state in which lens guide 341 is not displaced in the Y direction by second shake correction apparatus 35 to be described later. Such a configuration reduces resonance of lens guide 341 around straight line $L_3$ passing through center of gravity G of the movable-side member and parallel to the Z direction.

Note that, each of springs 342a1 to 342a4 as described above is arranged in the following manner. When a straight line passing through center of gravity G described above and parallel to the direction of the second optical axis (that is, the X direction) is straight line $L_4$ (see FIG. 14), a pair of springs 342a1 and 342a2 on the + side in the X direction is arranged at two points symmetrical with respect to straight line $L_4$ described above and separated from center of gravity G by prescribed distances on the + side in the X direction (the right side in FIG. 14). On the other hand, a pair of springs 342a3 and 342a4 on the − side in the X direction is arranged at two points symmetrical with respect to straight line $L_4$ described above and separated from center of gravity G by the prescribed distances described above on the − side in the X direction (the left side in FIG. 14). As a result, the intersection of straight line $L_1$ described above and straight line $L_2$ described above coincides with center of gravity G described above.

[Second Support Mechanism]

Second support mechanism 343 will be described with reference to FIGS. 9A to 13. Second support mechanism 343 supports lens guide 341 on second base 32 in a state in which lens guide 341 is displaceable with respect to second base 32 within the XY plane. However, second support mechanism 343 supports lens guide 341 in a state in which displacement of lens guide 341 with respect to second base 32 in the Z direction is regulated. Specifically, second support mechanism 343 supports lens guide 341 in a state in which lens guide 341 is non-displaceable with respect to second base 32 on the + side in the Z direction.

Second support mechanism 343 includes a plurality of ball holding parts 343a, a pair of track members 343b1 and 343b2, connection member 343d, and a plurality of balls 343e.

The plurality of ball holding parts 343a are provided on surfaces on the + side in the Z direction of second overhang parts 34a3 and 34a4 of lens guide 341. In the case of the present embodiment, three of the plurality of ball holding parts 343a are provided on each of the surfaces on the + side in the Z direction of second overhang parts 34a3 and 34a4.

Each of the pair of track members 343b1 and 343b2 is, for example, a plate-like member parallel to the XY plane. Each of the pair of track members 343b1 and 343b2 as such is made of a magnetic metal such as an iron-based alloy.

Track member 343b1 and first OIS magnet 352a arranged on the + side in the Y direction are arranged on the same straight line parallel to the Z direction. Further, track member 343b1 is arranged on the + side in the Z direction with respect to first OIS magnet 352a. Further, track member 343b2 and second OIS magnet 353a arranged on the − side in the Y direction are arranged on the same straight line parallel to the Z direction. Further, track member 343b2 is arranged on the + side in the Z direction with respect to second OIS magnet 353a.

With such an arrangement, first OIS magnet 352a is attracted in a direction approaching track member 343b1 (that is, on the + side in the Z direction) based on the own magnetic force of first OIS magnet 352a.

Further, second OIS magnet 353a is attracted in a direction approaching track member 343b2 (that is, on the + side in the Z direction) based on the own magnetic force of second OIS magnet 353a.

The force acting between first OIS magnet 352a and second OIS magnet 353a and track members 343b1 and 343b2 as such is capable of floating the movable-side member described above from the fixed-side member (second base 32), for example, in a case where springs 342a1 to 342a4 are omitted (that is, in the case of Embodiment 2 to be described later).

Specifically, each of the pair of track members 343b1 and 343b2 is provided on the + side in the Z direction with respect to second overhang part 34a3 and 34a4 of lens guide 341, in a state in which each of the pair of track members 343b1 and 343b2 faces surfaces on the + side in the Z direction of second overhang part 34a3 and 34a4.

Each of the pair of track members 343b1 and 343b2 includes track surface 343c having a flat surface shape (see FIGS. 11 and 12) on a surface on the − side in the Z direction. Each track surface 343c faces surfaces on the + side in the Z direction of second overhang parts 34a3 and 34a4, in the Z direction.

End parts on the − side in the X direction of the pair of track members 343b1 and 343b2 are connected to each other by connection member 343d. Connection member 343d is arranged in cutout part 31f of top plate part 31a of second cover 31 (see FIGS. 9A and 9C). In this state, connection member 343d covers cutout part 31f in its entirety. Thus, connection member 343d prevents light from entering lens part 33 from cutout part 31f. Further, connection member 343d is fixed to second cover 31. Since second cover 31 is fixed to second base 32, connection member 343d and the pair of track members 343b1 and 343b2 are fixed to second base 32 via second cover 31.

The plurality of balls 343e are held by the plurality of ball holding parts 343a, respectively. In this state in which the plurality of balls 343e are held by the plurality of ball holding parts 343a, the plurality of balls 343e are freely rotatably arranged between inner surfaces of the plurality of ball holding parts 343a and track surfaces 343c of the pair of track members 343b1 and 343b2. Each of the plurality of balls 343e abuts on the inner surfaces of the plurality of ball holding parts 343a and on track surfaces 343c of the pair of track members 343b1 and 343b2.

[FPC]

FPC 344 will be described with reference to FIGS. 15 to 17A, 21 and 22. FPC 344 is a flexible printed circuit board and is fixed to second base 32 (see FIGS. 9C and 10).

FPC 344 includes FPC base 344a, first terminal part 34d1, second terminal part 34d2, third terminal part 34d3, first coil fixed part 34d4, second coil fixed part 34d5, first controller fixed part 34d6, second controller fixed part 34d7, Hall element fixed part 34d8, and AF driving control circuit 344b (see FIG. 17A).

Figure 10:
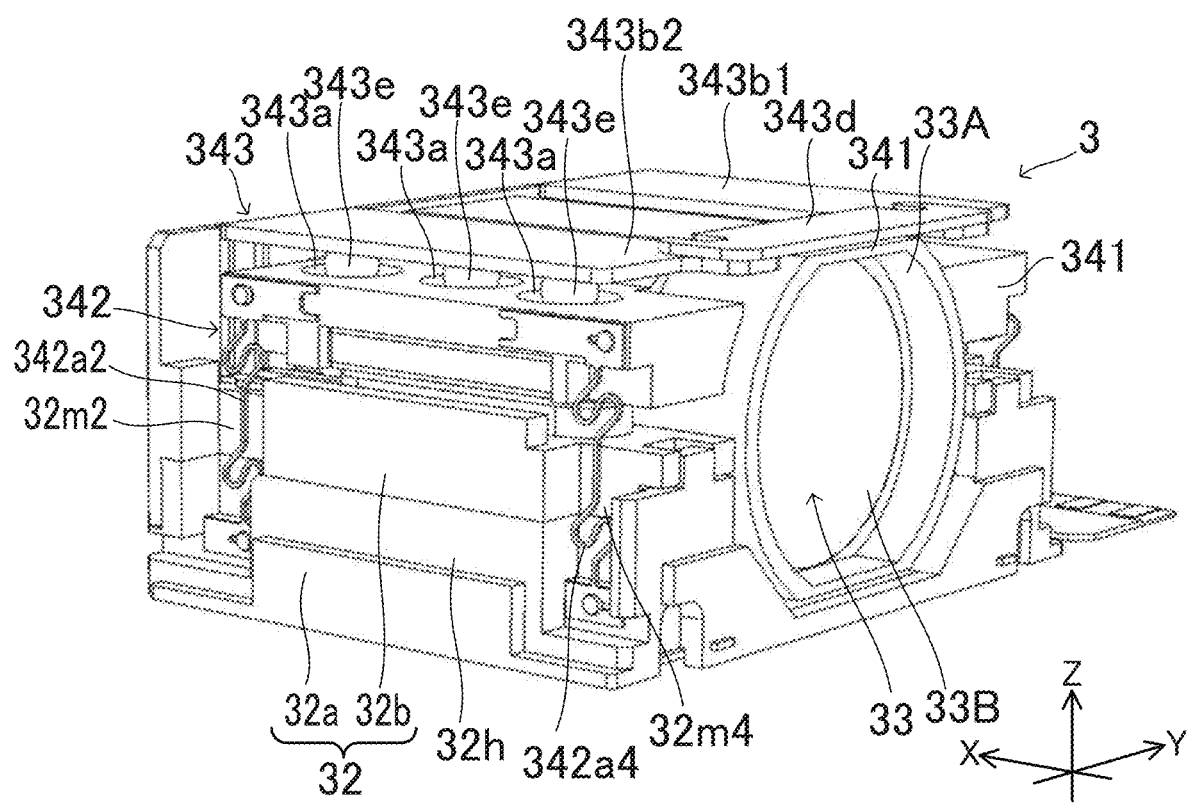
FIG. 10 is a perspective view of the lens module from which some members are omitted, in a state in which the lens module is viewed from an angle different from that in FIG. 9C.

FPC base 344a is a plate-like member parallel to the XY plane, and is fixed to second base 32 (see FIGS. 9C and 10).

Each of first terminal part 34d1 and second terminal part 34d2 extends on the + side in the Z direction from two points apart from each other in the Y direction in an end part on the + side in the X direction of FPC base 344a. First terminal part 34d1 is electrically connected to first OIS coil 352b. Second terminal part 34d2, on the other hand, is electrically connected to second OIS coil 353b.

Third terminal part 34*d*3 is connected to sensor board 6 (FIG. 17A) on which imaging element module 4 is mounted. As illustrated in FIG. 17A, third terminal part 34*d*3 includes power supply terminal T1, grounding terminal T2, data signal terminal T3, first clock terminal T4, and second clock terminal T5. Each terminal of third terminal part 34*d*3 as such, in a state in which FPC 344 is connected to sensor board 6, is connected to each corresponding terminal in board-side circuit 6*a* of sensor board 6.

On a surface on the + side in the Z direction of FPC base 344*a*, first coil fixed part 34*d*4 and second coil fixed part 34*d*5 are provided at positions facing first magnet holding parts 34*a*5 and 34*a*6 of lens guide 341, respectively, in the Z direction. Specifically, on the surface on the + side in the Z direction of FPC base 344*a*, first coil fixed part 34*d*4 and second coil fixed part 34*d*5 are provided apart from each other on one side (the + side in the Y direction) in the Y direction and on the other side (the − side in the Y direction) in the Y direction about the second optical axis.

First AF coil 346*b* and second AF coil 347*b* are fixed to first coil fixed part 34*d*4 and second coil fixed part 34*d*5 as such, respectively. First coil fixed part 34*d*4 and second coil fixed part 34*d*5 are arranged in bottom through-holes 32*e* and 32*f* (see FIGS. 18 and 19) of second base 32, respectively.

On the surface on the + side in the Z direction of FPC base 344*a*, first controller fixed part 34*d*6 and second controller fixed part 34*d*7 are provided in the vicinity of first coil fixed part 34*d*4 and second coil fixed part 34*d*5, respectively. Specifically, on the + side in the Z direction surface of FPC base 344*a*, first controller fixed part 34*d*6 and second controller fixed part 34*d*7 are provided in the vicinity on the − side in the X direction with respect to first coil fixed part 34*d*4 and second coil fixed part 34*d*5, respectively.

First AF controller 346*c* and second AF controller 347*c* are fixed to first controller fixed part 34*d*6 and second controller fixed part 34*d*7 as such, respectively.

On the surface on the + side in the Z direction of FPC base 344*a*, Hall element fixed part 34*d*8 is provided at a position where Hall element fixed part 34*d*8 and fourth magnet holding part 34*b*6 (see FIG. 12) of lens guide 341 face each other in the Z direction. OIS Hall element 353*d* of rear-side OIS actuator 351 to be described later is fixed to Hall element fixed part 34*d*8.

As illustrated in FIG. 17A, AF driving control circuit 344*b* includes first power supply line L1, second power supply line L2, first grounding line L3, second grounding line L4, first data signal line L5, second data signal line L6, first clock line L7, second clock line L8, first coil power supply lines L9 and L10, and second coil power supply lines L11 and L12.

First power supply line L1 is a transmission line for current supplied from control section 5 mounted on sensor board 6 to first AF controller 346*c*. One end of first power supply line L1 is connected to power supply terminal T1 of third terminal part 34*d*3. The other end of first power supply line L1 is connected to an input-side power supply terminal (not illustrated) of first AF controller 346*c*.

Second power supply line L2 is a transmission line for current supplied from control section 5 mounted on sensor board 6 to second AF controller 347*c*. One end of second power supply line L2 is connected to power supply terminal T1 of third terminal part 34*d*3. The other end of second power supply line L2 is connected to an input-side power supply terminal (not illustrated) of second AF controller 347*c*. As described above, first power supply line L1 and second power supply line L2 are branched in the middle.

First grounding line L3 is a transmission line for grounding. One end of first grounding line L3 is connected to grounding terminal T2 of third terminal part 34*d*3. The other end of first grounding line L3 is connected to a grounding terminal (not illustrated) of first AF controller 346*c*.

Second grounding line L4 is a transmission line for grounding. One end of second grounding line L4 is connected to grounding terminal T2 of third terminal part 34*d*3. The other end of second grounding line L4 is connected to a grounding terminal (not illustrated) of second AF controller 347*c*. First grounding line L3 and second grounding line L4 are branched in the middle.

First data signal line L5 is a transmission line for a control signal between control section 5 and first AF controller 346*c*. One end of first data signal line L5 is connected to data signal terminal T3 of third terminal part 34*d*3. The other end of first data signal line L5 is connected to an input-side data signal terminal (not illustrated) of first AF controller 346*c*.

Second data signal line L6 is a transmission line for a control signal between control section 5 and second AF controller 347*c*. One end of second data signal line L6 is connected to data signal terminal T3 of third terminal part 34*d*3. The other end of second data signal line L6 is connected to an input-side data signal terminal (not illustrated) of second AF controller 347*c*. First data signal line L5 and second data signal line L6 are branched in the middle.

First AF controller 346*c* and second AF controller 347*c* may operate alternately at prescribed time intervals based on control signals received from control section 5. In other words, control section 5 may transmit control signals to first AF controller 346*c* and second AF controller 347*c* such that first AF controller 346*c* and second AF controller 347*c* operate alternately at prescribed time intervals.

Control section 5 may illustratively transmit control signals to first AF controller 346*c* and second AF controller 347*c* at the same time. Control section 5 may transmit control signals at prescribed time intervals. Such a control signal may include information instructing operation of one controller (hereinafter, referred to as "target controller") of first AF controller 346*c* and second AF controller 347*c*.

First AF controller 346*c* and second AF controller 347*c* may analyze the information instructing operation included in a control signal received from control section 5, and first AF controller 346*c* or second AF controller 347*c* may operate based on the control signal in a case where first AF controller 346*c* or second AF controller 347*c* corresponds to the target controller.

Further, control section 5 may illustratively transmit control signals to first AF controller 346*c* and second AF controller 347*c* alternately at prescribed time intervals. A controller of first AF controller 346*c* and second AF controller 347*c*, which receives a control signal from control section 5, may operate based on the received control signal.

First clock line L7 is a transmission line for a clock signal between control section 5 and first AF controller 346*c*. One end of first clock line L7 is connected to first clock terminal T4 of third terminal part 34*d*3. The other end of first clock line L7 is connected to a clock terminal (not illustrated) of first AF controller 346*c*.

Second clock line L8 is a transmission line for a clock signal between control section 5 and second AF controller 347*c*. One end of second clock line L8 is connected to second clock terminal T5 of third terminal part 34*d*3. The other end of second clock line L8 is connected to a clock terminal (not illustrated) of second AF controller 347*c*.

First coil power supply lines L9 and L10 are transmission lines that connect first AF controller 346c and first AF coil 346b.

One end of first coil power supply line L9 is connected to a first terminal (not illustrated) of an output-side power supply terminal of first AF controller 346c. The other end of first coil power supply line L9 is connected to one end of first AF coil 346b.

One end of first coil power supply line L10 is connected to a second terminal (not illustrated) of the output-side power supply terminal of first AF controller 346c. The other end of first coil power supply line L10 is connected to the other end of first AF coil 346b.

Second coil power supply lines L11 and L12 are transmission lines that connect second AF controller 347c and second AF coil 347b.

One end of second coil power supply line L11 is connected to a first terminal (not illustrated) of an output-side power supply terminal of second AF controller 347c. The other end of second coil power supply line L11 is connected to one end of second AF coil 347b.

One end of second coil power supply line L12 is connected to a second terminal (not illustrated) of the output-side power supply terminal of second AF controller 347c. The other end of second coil power supply line L12 is connected to the other end of second AF coil 347b.

AF driving control circuit 344b as described above is connected to sensor board 6 via third terminal part 34d3. With this, first AF controller 346c and second AF controller 347c are connected to control section 5 mounted on sensor board 6.

[AF Actuator]

AF actuator 345 will be described with reference to FIGS. 11, 12, 16 and 17A. AF actuator 345 is a driving mechanism that displaces lens guide 341 in the X direction (the direction of the second optical axis) during autofocusing.

AF actuator 345 includes first AF actuator 346 arranged on the + side in the Y direction and second AF actuator 347 arranged on the − side in the Y direction.

First AF actuator 346 is a driving mechanism part, and includes first AF magnet 346a, first AF coil 346b, first X-position detecting magnet 346d, and first AF controller 346c.

Second AF actuator 347 is a driving mechanism part, and includes second AF magnet 347a, second AF coil 347b, second X-position detecting magnet 347d, and second AF controller 347c.

First AF actuator 346 and second AF actuator 347 as such are moving magnet-type actuators in which first AF magnet 346a and second AF magnet 347a are fixed to lens guide 341, which is the movable-side member, and first AF coil 346b and second AF coil 347b are fixed to second base 32, which is the fixed-side member.

Note that, first AF actuator 346 and second AF actuator 347 may be moving coil-type actuators. Hereinafter, arrangement of respective components of AF actuator 345 will be described.

First AF magnet 346a and second AF magnet 347a are held by first magnet holding parts 34a5 and 34a6 of lens guide 341, respectively. In this state, first AF magnet 346a and second AF magnet 347a are arranged on the + side in the Z direction of the pair of coil mount parts 32i and 32j (see FIGS. 9C and 10) of second base 32, respectively. In the case of the present embodiment, each of first AF magnet 346a and second AF magnet 347a is composed of two magnet elements (reference sign is omitted) arranged so as to be adjacent to each other in the Y direction. These respective magnet elements are magnetized in the Z direction and are arranged such that the directions of the magnetic poles of the respective magnet elements are opposite to each other.

Further, each of first AF magnet 346a and second AF magnet 347a is a cuboid which is long in the X direction and whose shape, viewed from the Y direction (the state illustrated in FIGS. 11 and 12), for example, is substantially rectangular.

Each of first AF coil 346a and second AF coil 347b is a so-called air-core coil having an oval shape, to which power is supplied during autofocusing. First AF coil 346a and second AF coil 347b are fixed, in a state in which the major axes coincide with the Y direction, to first coil fixed part 34d4 and second coil fixed part 34d5 of FPC 344, respectively, via a board (not illustrated).

As illustrated in FIG. 17A, first AF coil 346b is connected to first AF controller 346c via first coil power supply lines L9 and L10. The current value of first AF coil 346b is controlled by first AF controller 346c.

First X-position detecting magnet 346d and second X-position detecting magnet 347d are cuboids which are magnetized in the Z direction and whose shape, viewed from the Y direction (the state illustrated in FIGS. 11 and 12), for example, is substantially rectangular. First X-position detecting magnet 346d and second X-position detecting magnet 347d as such are held by a pair of third magnet holding portions 34b3 and 34b4 of lens guide 341, respectively.

First AF controller 346c is fixed to first controller fixed part 34d6 of FPC 344. First AF controller 346c as such includes first detection part 346e and first driving control section 346f as illustrated in FIG. 17A.

First detection part 346e detects magnetic flux (also referred to as positional information) between first AF magnet 346a and first X-position detecting magnet 346d. First detection part 346e transmits a detected value to first driving control section 346f. First driving control section 346f determines the position of first AF magnet 346a in the X direction (the position will also be referred to as first position) based on a detected value received from first detection part 346e. Further, first driving control section 346f controls the current value of first AF coil 346b based on a detected value received from first detection part 346e. Note that, first AF controller 346c does not control the current value of second AF coil 347b.

As described above, in first AF actuator 346, closed loop control is performed based on a detected value by first detection part 346e. Note that, first driving control section 346f may be omitted. In this case, processing performed by first driving control section 346f may be performed by, for example, control section 5 mounted on sensor board 6.

Further, second AF controller 347c is fixed to second controller fixed part 34d7 of FPC 344. As illustrated in FIG. 17A, second AF controller 347c as such includes second detection part 347e and second driving control section 347f.

Second detection part 347e detects magnetic flux (also referred to as positional information) between second AF magnet 347a and second X-position detecting magnet 347d. Second detection part 347e transmits a detected value to second driving control section 347f.

Second driving control section 347f determines the position of second AF magnet 347a in the X direction (the position will also be referred to as second position) based on a detected value (positional information) received from second detection part 347e. Further, second driving control section 347f controls the current value of second AF coil 347b based on a detected value received from second detection part 347*e*. Note that, second AF controller 347*c* does not control the current value of first AF coil 346*b*.

As described above, in second AF actuator 347, closed loop control is performed based on a detected value by second AF controller 347*c*. Note that, second driving control section 347*f* may be omitted. In this case, processing performed by second driving control section 347*f* may be performed by, for example, control section 5 mounted on sensor board 6.

In the case of first AF actuator 346 and second AF actuator 347 having the configurations as described above, when current flows through first AF coil 346*a* and second AF coil 347*b* under the control by first AF controller 346*c* and second AF controller 347*c*, a Lorentz force (thrust) that displaces first AF magnet 346*a* and second AF magnet 347*a* in the X direction is generated.

Such thrust changes by controlling the direction of current flowing through first AF coil 346*b* and second AF coil 347*b*. Thus, the direction of displacement of lens guide 341 can be changed.

In the configuration of the present embodiment, thrust generated by first AF actuator 346 and thrust generated by second AF actuator 347 can be caused to differ from each other by independently controlling the current value of first AF coil 346*b* of first AF actuator 346 and the current value of second AF coil 347*b* of second AF actuator 347.

Specifically, in a case where thrust generated by first AF actuator 346 and thrust generated by second AF actuator 347 are the same, thrust generated by AF actuator 345 is composed only of first thrust in the X direction. On the other hand, in a case where thrust generated by first AF actuator 346 and thrust generated by second AF actuator 347 differ from each other, thrust generated by AF actuator 345 includes the first thrust in the X direction and second thrust that is a moment around center of gravity G of the movable-side member.

The second thrust as such serves as a resistance force that resists an external force to cause lens guide 341 to deviate from the X direction during autofocusing. Thus, the amount of deviation of lens guide 341 from the X direction can be reduced or be set to zero by AF actuator 345 during autofocusing. Note that, the external force described above will be described later.

Further, in the case of the present embodiment, AF actuator 345 is also a second driving mechanism part that generates a resistance force that resists an external force acting to cause the movable-side member (lens guide 341) to deviate from the Y direction when second shake correction apparatus 35 to be described later performs shake correction.

That is, AF actuator 345 detects the positions of first AF magnet 346*a* and second AF magnet 347*a* in the X direction by first AF controller 346*c* and second AF controller 347*c* when second shake correction apparatus 35 to be described later performs shake correction.

Further, first AF controller 346*c* and second AF controller 347*c* control the current values of first AF coil 346*b* and second AF coil 347*b*, respectively, based on detected values. Thus, when second shake correction apparatus 35 performs shake correction, AF actuator 345 generates a resistance force against an external force to cause lens guide 341 to deviate from the Y direction. As a result, the amount of deviation of lens guide 341 from the Y direction can be reduced or be set to zero by AF actuator 345 during shake correction.

[Modification of AF Actuator]

Figure 17B:
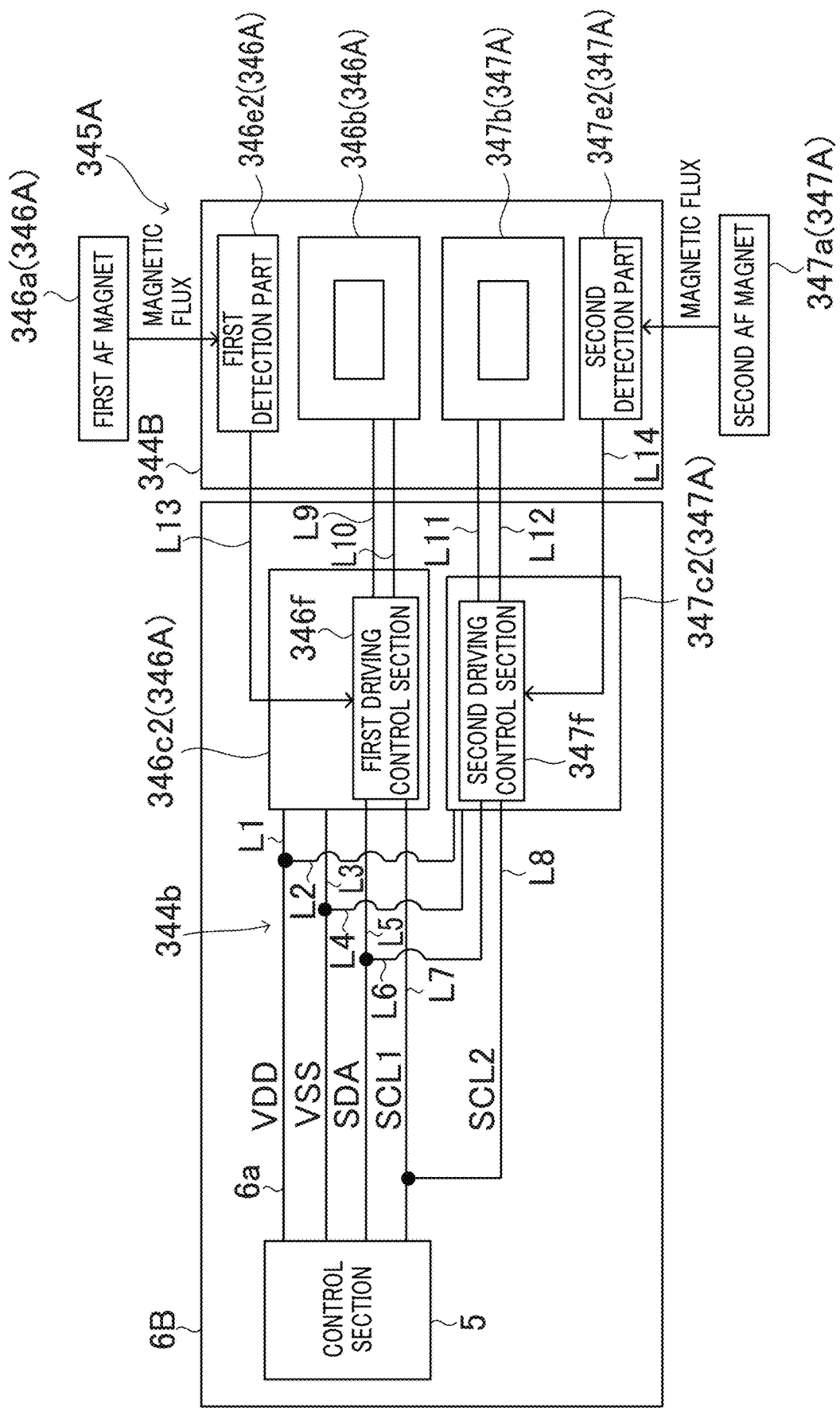
FIG. 17B is a circuit diagram according to Modification 1 of the AF driving control circuit.
Figure 18:
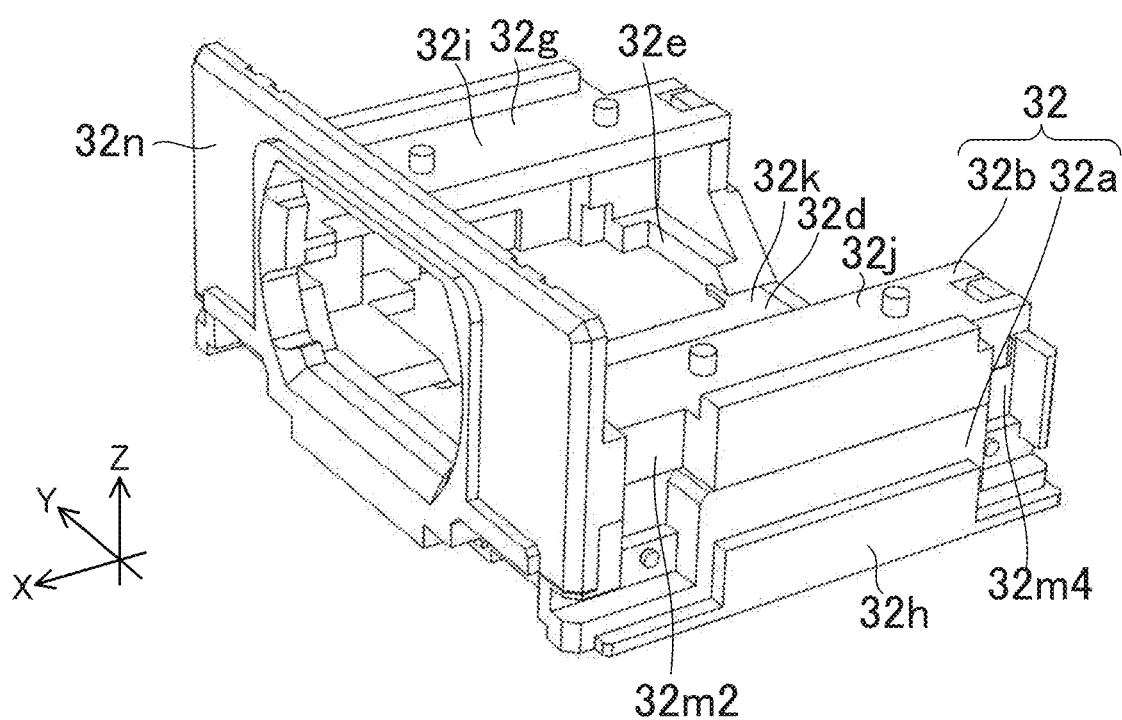
FIG. 18 is a perspective view of the second base.
Figure 19:
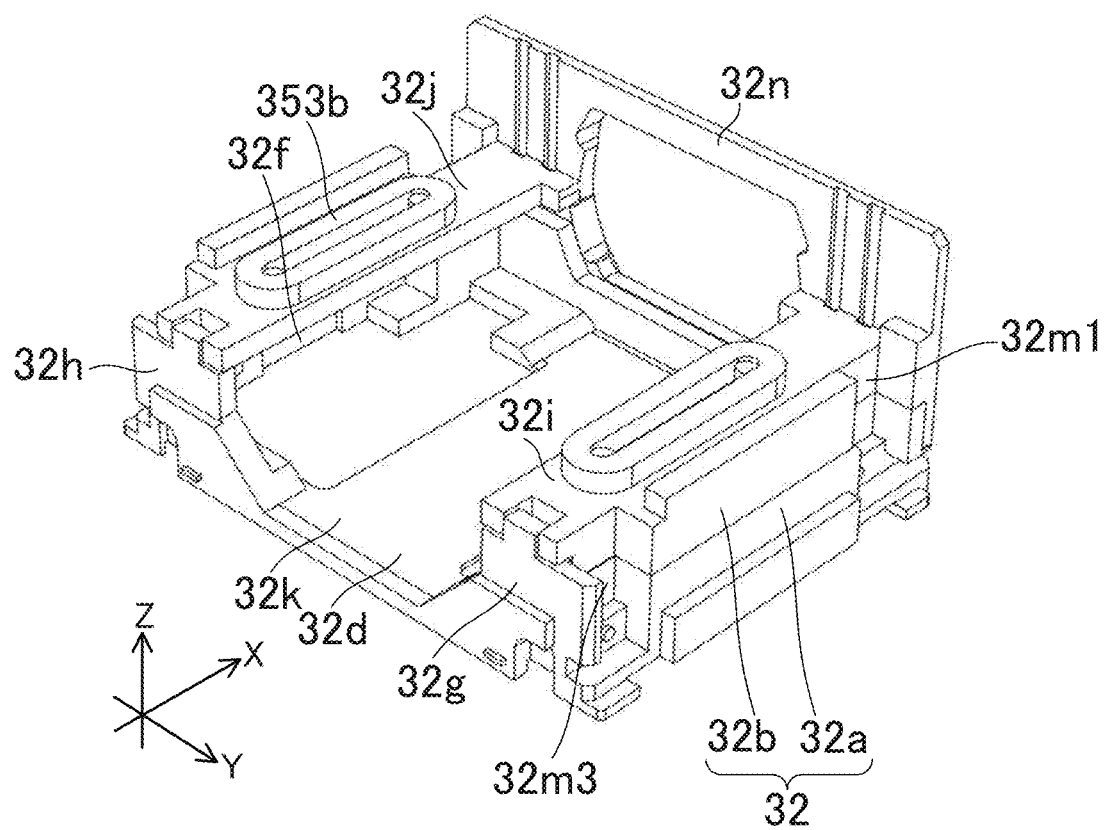
FIG. 19 is a perspective view of the second base viewed from an angle different from that in FIG. 18.

FIG. 17B is a circuit diagram of an AF driving control circuit including AF actuator 345A according to Modification 1 of AF actuator 345. AF actuator 345A includes first AF actuator 346A arranged on the + side in the Y direction and second AF actuator 347A arranged on the − side in the Y direction.

First AF actuator 346A is a driving mechanism part, and includes first AF magnet 346*a*, first AF coil 346*b*, first X-position detecting magnet 346*d* (see FIG. 11), first detection part 346*e*2, and first AF controller 346*c*2.

Second AF actuator 347A is a driving mechanism part, and includes second AF magnet 347*a*, second AF coil 347*b*, second X-position detecting magnet 347*d* (see FIG. 12), second detection part 347*e*2, and second AF controller 347*c*2.

In first AF actuator 346A, first AF magnet 346*a*, first AF coil 346*b*, and first X-position detecting magnet 346*d* (see FIG. 11) are the same as those in the case of first AF actuator 346 mentioned above. Further, in second AF actuator 347A, second AF magnet 347*a*, second AF coil 347*b*, and second X-position detecting magnet 347*d* (see FIG. 12) are the same as those in the case of second AF actuator 347 mentioned above.

First detection part 346*e*2 is provided separately from first AF controller 346*c*2. Specifically, first detection part 346*e*2 is fixed to FPC 344B. The function of first detection part 346*e*2 is the same as the function of first detection part 346*e* mentioned above. Further, FPC 344B has substantially the same configuration as that of FPC 344 mentioned above.

On the other hand, first AF controller 346*c*2 is provided on sensor board 6B. First AF controller 346*c*2 includes first driving control section 346*f*. First driving control section 346*f* is the same as first AF actuator 346 mentioned above. First driving control section 346*f* and first detection part 346*e*2 are connected via signal line L13. First detection part 346*e*2 detects magnetic flux (also referred to as positional information) between first AF magnet 346*a* and first X-position detecting magnet 346*d*. First detection part 346*e*2 transmits a detected value to first driving control section 346*f*.

Second detection part 347*e*2 is provided separately from second AF controller 347*c*2. Specifically, second detection part 347*e*2 is fixed to FPC 344B. The function of second detection part 347*e*2 is the same as the function of second detection part 347*e* mentioned above.

On the other hand, second AF controller 347*c*2 is provided on sensor board 6B. Second AF controller 347*c*2 includes second driving control section 347*f*. Second driving control section 347*f* is the same as second AF actuator 347 mentioned above. Second driving control section 347*f* and second detection part 347*e*2 are connected via signal line L14. Second detection part 347*e*2 detects magnetic flux (also referred to as positional information) between second AF magnet 347*a* and second X-position detecting magnet 347*d*. Second detection part 347*e*2 transmits a detected value to second driving control section 347*f*. Other configuration, operation, and effect of AF actuator 345A are the same as those of AF actuator 345 mentioned above.

[Second Shake Correction Apparatus]

Figure 16:
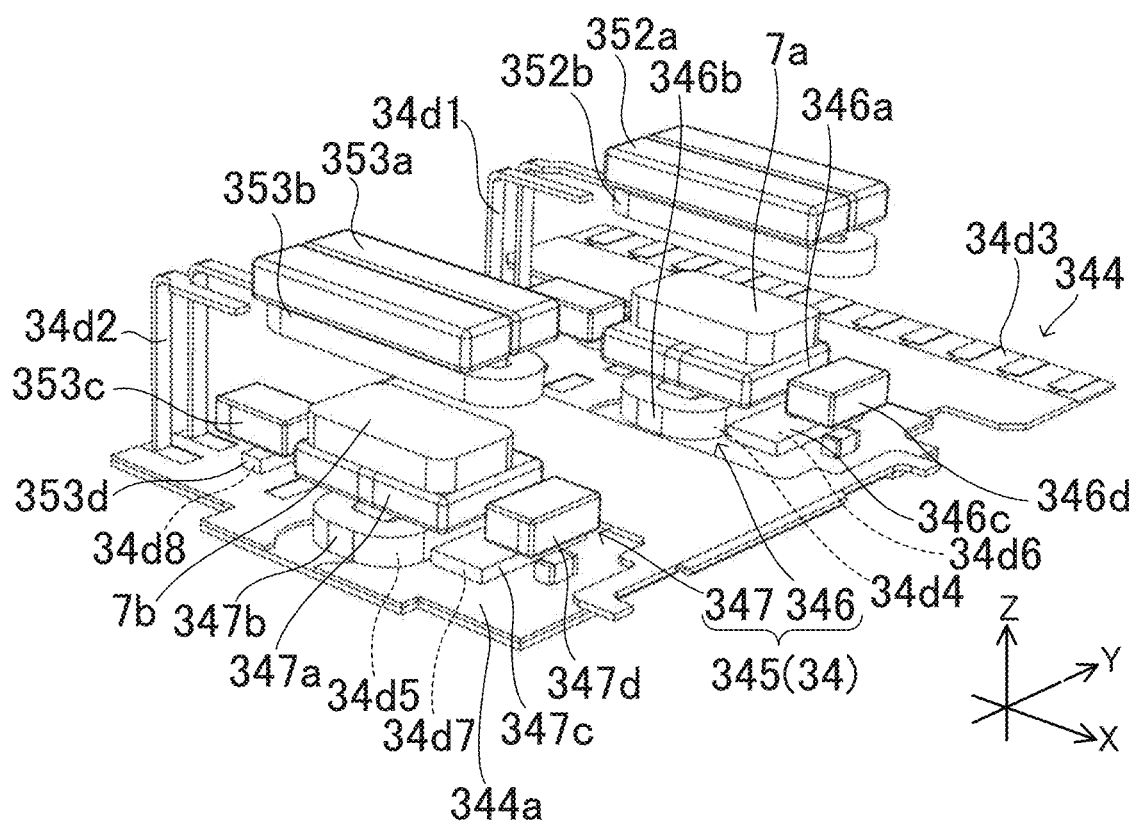
FIG. 16 is a perspective view of the FPC, the AF actuator, and the rear-side OIS actuator viewed from an angle different from that in FIG. 15.

Second shake correction apparatus 35 will be described with reference to FIGS. 11, 12 and 16. Second shake correction apparatus 35 is a driving section and performs shake correction in the Y direction by displacing lens part 33 in the Y direction. Shake correction apparatus 35 as such is arranged in second accommodation space 32*c* (see FIG. 1) described above.

Second shake correction apparatus 35 includes lens guide 341 described above, the plurality of springs 342a1 to 342a4 described above, FPC 344 described above, and rear-side OIS actuator 351.

Lens guide 341, springs 342a1 to 342a4, and FPC 344 are common to those in AF apparatus 34.

Rear-side OIS actuator 351 is a driving mechanism, and includes first OIS actuator 352 arranged on the + side in the Y direction and second OIS actuator 353 arranged on the − side in the Y direction.

As illustrated in FIG. 11, first OIS actuator 352 is a driving mechanism part and is arranged in a state of overlapping first AF actuator 346 with a prescribed gap therebetween in the Z direction. First OIS actuator 352 as such includes first OIS magnet 352a, first OIS coil 352b, and Y-position detecting magnet 352c.

As illustrated in FIG. 12, second OIS actuator 353 is a driving mechanism part and is arranged in a state of overlapping second AF actuator 347 with a prescribed gap therebetween in the Z direction. Second OIS actuator 353 as such includes second OIS magnet 353a, second OIS coil 353b, Y-position detecting magnet 353c, and OIS Hall element 353d.

By arranging first OIS actuator 352 and second OIS actuator 353 and first AF actuator 346 and second AF actuator 347 as described above, the center of the driving force of rear-side OIS actuator 351 coincides with or is close to the center of the driving force of AF actuator 345. This configuration makes it difficult for lens guide 341 to be tilt-displaced (that is, swinging displacement about an axis parallel to the Y direction or the Z direction) during autofocusing and shake correction.

Rear-side OIS actuator 351 as described above is a moving magnet-type actuator in which first OIS magnet 352a and second OIS magnet 353a are fixed to lens guide 341, which is the movable-side member, and first OIS coil 352b and second OIS coil 353b are fixed to second base 32, which is the fixed-side member. Rear-side OIS actuator 351 may be, however, a moving coil-type actuator.

First OIS magnet 352a and second OIS magnet 353a are held by second magnet holding part 34a7 and second magnet holding part 34a8 of lens guide 341, respectively.

In the case of the present embodiment, each of first OIS magnet 352a and second OIS magnet 353a is composed of two magnet elements (reference sign is omitted) arranged so as to be adjacent to each other in the Y direction. These respective magnet elements are magnetized in the Z direction and are arranged such that the directions of the magnetic poles of the respective magnet elements are opposite to each other.

Each of first OIS coil 352b and second OIS coil 353b is a so-called air-core coil having an oval shape, to which power is supplied during shake correction. First OIS coil 352b and second OIS coil 353b are fixed, in a state in which the major axes coincide with the X direction, to coil mount parts 32i and 32j of second base 32, respectively. In this state, first OIS coil 352b and second OIS coil 353b overlap first OIS magnet 352a and second OIS magnet 353a, respectively, with prescribed gaps therebetween in the Z direction.

As described above, at least part of first OIS actuator 352 (first OIS magnet 352a and first OIS coil 352b) is arranged between first overhang part 34a1 and second overhang part 34a3 of lens guide 341 in the Z direction. On the other hand, at least part of second OIS actuator 353 (second OIS magnet 353a and second OIS coil 353b) is arranged between first overhang part 34a2 and second overhang part 34a4 of lens guide 341 in the Z direction. Such a configuration is effective in reducing the height of lens module 3 and further the height of camera module 1.

Y-position detecting magnet 352c is held by fourth magnet holding part 34b5 of lens guide 341. Further, Y-position detecting magnet 353c is held by fourth magnet holding part 34b6 of lens guide 341.

As illustrated in FIG. 12, OIS Hall element 353d is fixed to Hall element fixed part 34d8 (see FIG. 15) of FPC 344. OIS Hall element 353d detects magnetic flux (also referred to as positional information) of Y-position detecting magnet 353c, and transmits a detected value to control section 5 (see FIG. 17A) mounted on sensor board 6. Control section 5 determines the position of Y-position detecting magnet 353c (that is, lens guide 341) in the Y direction based on a detected value received from OIS Hall element 353d.

In the case of rear-side OIS actuator 351 having the configuration as described above, when current flows through first OIS coil 352b and second OIS coil 353b via FPC 344 under the control by control section 5, a Lorentz force that displaces first OIS magnet 352a and second OIS magnet 353a in the Y direction is generated. Since each of first OIS magnet 352a and second OIS magnet 353a is fixed to lens guide 341, lens guide 341 is displaced in the Y direction based on the Lorentz force described above. Note that, the direction of displacement of lens guide 341 changes by controlling the direction of current flowing through first OIS coil 352b and second OIS coil 353b.

Note that, in the case of the present embodiment, shield plates 7a and 7b (see FIGS. 15 and 16) made of a magnetic metal are arranged between first OIS magnet 352a and first AF magnet 346a in the Z direction and between second OIS magnet 353a and second AF magnet 347a in the Z direction to prevent crosstalk between rear-side OIS actuator 351 and AF actuator 345.

[Imaging Element Module]

Imaging element module 4 is arranged on the + side in the X direction with respect to lens part 33. Imaging element module 4 includes, for example, an imaging element such as a charge-coupled device (CCD) image sensor and a complementary metal oxide semiconductor (CMOS) image sensor. The imaging element of imaging element module 4 captures a subject image formed by lens part 33 and outputs an electrical signal corresponding to the subject image. Sensor board 6 is electrically connected to imaging element module 4, power is supplied to imaging element module 4, and an electrical signal of a subject image captured by imaging element module 4 is output via sensor board 6. As imaging element module 4 as such, a conventionally known structure can be used.

[Operations of Second Shake Correction Apparatus and AF Apparatus]

Hereinafter, operations of second shake correction apparatus 35 and AF apparatus 34 of the present embodiment will be described with reference to FIGS. 17A and 23B. Note that, a description of operation of first shake correction apparatus 24 will be omitted.

In a case where shake correction is performed in second shake correction apparatus 35, power is supplied to first OIS coil 352b and second OIS coil 353b. Specifically, in second shake correction apparatus 35, the current values of first OIS coil 352b and second OIS coil 353b are controlled based on a detection signal from a shake detection part (illustration is omitted; for example, a gyro sensor) so as to compensate for shake of camera module 1 in the Y direction. Such control is performed, for example, by control section 5. At this time, displacement of lens guide 341 can be accurately controlled by giving feedback on a detected value of OIS Hall element 353d to control section 5.

When power is supplied to first OIS coil 352b and second OIS coil 353b, a Lorentz force is generated at first OIS coil 352b and second OIS coil 353b by interaction between current flowing through first OIS coil 352b and a magnetic field of first OIS magnet 352a and interaction between current flowing through second OIS coil 353b and a magnetic field of second OIS magnet 353a (Fleming's left hand rule).

In the case of the present embodiment, the direction of a Lorentz force is a direction (also referred to as specific direction) that is one direction or the other direction in the Y direction. Since first OIS coil 352b and second OIS coil 353b are fixed to second base 32, a reaction force works on first OIS magnet 352a and second OIS magnet 353a. The reaction force serves as a driving force of an OIS voice coil motor and lens guide 341 holding first OIS magnet 352a and second OIS magnet 353a is displaced in the Y direction within the XY plane, thereby shake correction is performed.

Figure 23A:
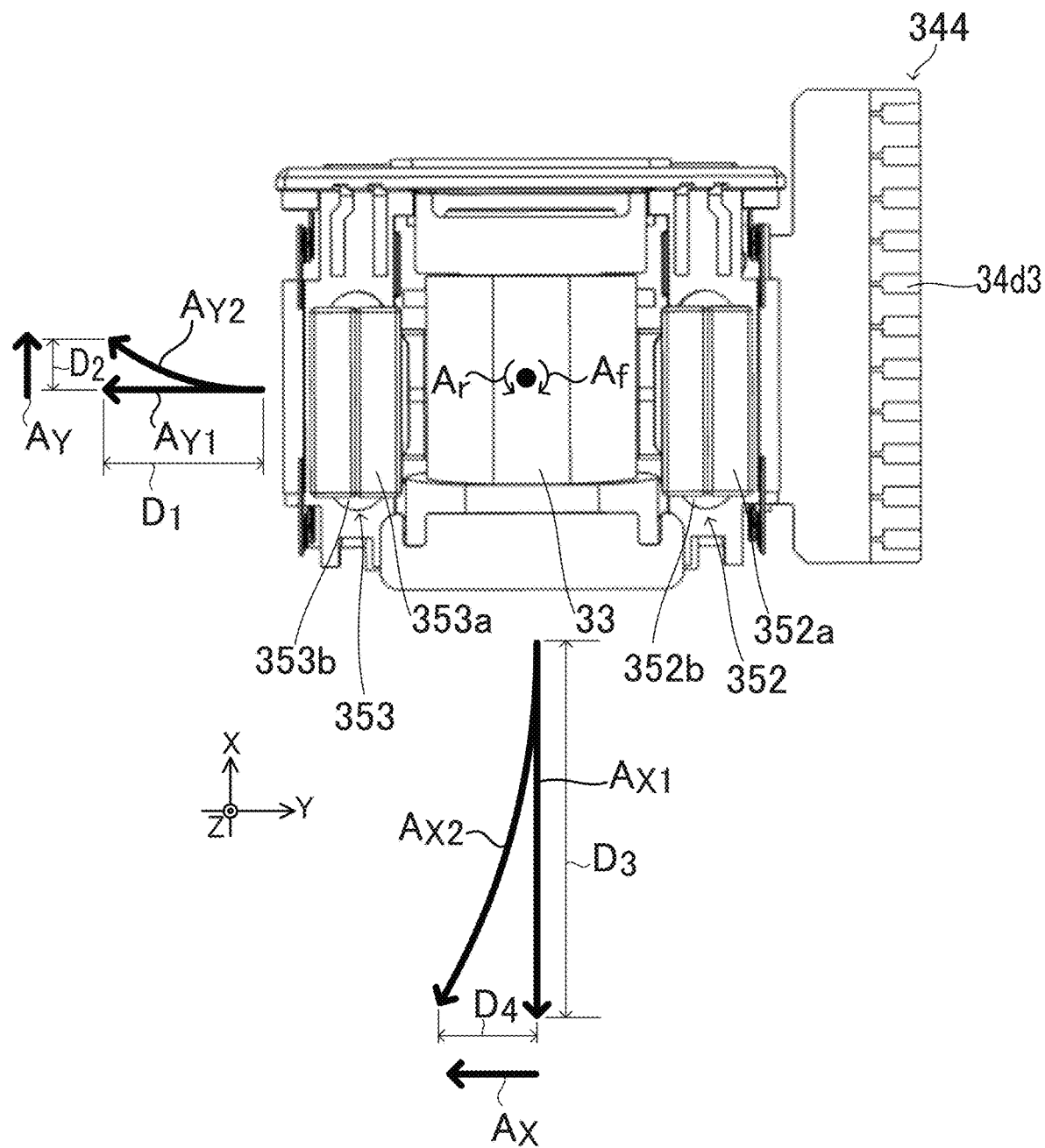
FIG. 23A is a plan view of the lens module from which some members are omitted.

In the shake correction as described above, lens guide 341 is preferably displaced in parallel to the Y direction as in arrow $A_{Y1}$ in FIG. 23A, for example. However, an external force (for example, a moment in the direction of arrow $A_r$ in FIG. 23A) such as to cause displacement of lens guide 341 to deviate from the Y direction may act on lens guide 341 during shake correction. In a case where such an external force acts, lens guide 341 is displaced in a direction deviating from the Y direction as in arrow $A_{Y2}$ in FIG. 23A when thrust acting on lens guide 341 is only thrust parallel to the Y direction generated by second shake correction apparatus 35 (first thrust). Note that, the external force described above may be generated, for example, due to a deviation between the center position of dispersed arrangement (the intersection of straight lines $L_1$ and $L_2$ in FIG. 14) in springs 342a1 to 342a4 forming first support mechanism 342 described above and center of gravity G of the movable-side member described above. Alternatively, the external force described above may be generated, for example, due to individual differences of springs 342a1 to 342a4 forming first support mechanism 342. Such an external force is not only the moment described above, but also, for example, a force directed in the X direction. Alternatively, the external force may also include a moment and a force directed in the X direction.

In the case of the present embodiment, on the other hand, AF actuator 345 is driven under the control by control section 5 during shake correction to generate a resistance force (second thrust) that resists the external force described above. Specifically, during shake correction, AF actuator 345 detects the position of first AF magnet 346a by first AF controller 346c (that is, first detection part 346e), and detects the position of second AF magnet 347a by second AF controller 347c (that is, second detection part 347e).

Further, first AF controller 346c (that is, first driving control section 3460 controls the current value (hereinafter, referred to as first current value) of first AF coil 346b based on a control signal (for example, a direction of displacement and an amount of displacement for shake correction) received from control section 5 and a detected value by first detection part 346e. Together therewith, second AF controller 347c (that is, second driving control section 3470 controls the current value (hereinafter, referred to as second current value) of second AF coil 347b based on a detected value by second detection part 347e. Thus, AF actuator 345 generates the resistance force described above (for example, a moment) based on thrust by first AF actuator 346 and thrust by second AF actuator 347.

Note that, the first current value and the second current value are selected from spare data stored in first driving control section 346f and second driving control section 347f, by calibration performed in advance, for example. The spare data includes, for example, shake correction parameters composed of the direction of displacement (for example, the direction of arrow $A_{Y1}$ in FIG. 23A), amount of displacement $D_1$ (see FIG. 23A), the direction of deviation of lens guide 341 from the Y direction (for example, the direction of arrow $A_Y$ in FIG. 23A), and amount of deviation $D_2$ of lens guide 341 from the Y direction (see FIG. 23A) in a case where lens guide 341 is displaced in the Y direction by second shake correction apparatus 35, and the first current value and the second current value that set amount of deviation $D_2$ described above (including an inclination) stored in association with the correction parameters to zero. In the calibration described above, the first current value and the second current value corresponding to the shake correction parameters are determined in an overall stroke range of lens guide 341 in the Y direction.

The resistance force generated by AF actuator 345 against the external force described above is, for example, a rotational moment in the direction of arrow $A_r$ in FIG. 23A. Further, AF actuator 345 causes a generated resistance force to act on lens guide 341. As a result, lens guide 341 on which a resultant force of thrust parallel to the Y direction (also referred to as specific direction) generated by second shake correction apparatus 35 and a resistance force generated by AF actuator 345 acts is displaceable in parallel to the Y direction as in arrow $A_{Y1}$ in FIG. 23A in a state where the external force described above acts.

Further, in a case where autofocusing is performed in AF apparatus 34, power is supplied to first AF coil 346b and second AF coil 347b. In the case of the present embodiment, the current value in first AF coil 346b is controlled by first AF controller 346c. Further, the current value in second AF coil 347b is controlled by second AF controller 347c.

Specifically, first AF controller 346c controls the current value (first current value) of first AF coil 346b based on a control signal received from control section 5 via first data signal line L5 and a detected value by first detection part 346e of first AF controller 346c.

Further, second AF controller 347c controls the current value (second current value) of second AF coil 347b based on a control signal received from control section 5 via second data signal line L6 and a detected value by second detection part 347e of second AF controller 347c.

When power is supplied to first AF coil 346b and second AF coil 347b, a Lorentz force is generated at first AF coil 346b and second AF coil 347b by interaction between current flowing through first AF coil 346b and a magnetic field of first AF magnet 346a and interaction between current flowing through second AF coil 347b and a magnetic field of second AF magnet 347a.

In a case where the direction and magnitude of a Lorentz force generated from first AF coil 346b and those of a Lorentz force generated from second AF coil 347b are equal, the direction of a resultant force of these respective Lorentz forces is either one direction or the other direction in the X direction. Since first AF magnet 346a and second AF magnet 347a are fixed to second base 32, a reaction force works on first AF coil 346b and second AF coil 347b. The reaction force serves as a driving force of an AF voice coil motor and lens guide 341 holding first AF coil 346b and second AF coil 347b is moved in the X direction (the direction of the second optical axis), thereby autofocusing is performed.

In the autofocusing as described above, lens guide 341 is preferably displaced in parallel to the X direction as in arrow $A_{X1}$ of FIG. 23A, for example. However, an external force (for example, a moment in the direction of arrow $A_f$ in FIG. 23A) such as to cause displacement of lens guide 341 to deviate from the X direction may act on lens guide 341 during autofocusing. In a case where such an external force acts, lens guide 341 is displaced in a direction deviating from the X direction as in arrow Axe in FIG. 23A when thrust acting on lens guide 341 is only thrust parallel to the X direction (first thrust). Such an external force is not only the moment described above, but also, for example, a force directed in the Y direction. Alternatively, the external force may also include a moment and a force directed in the Y direction.

In the case of the present embodiment, on the other hand, thrust including thrust parallel to the X direction (first thrust) and a resistance force (second thrust) that resists the external force is generated by causing thrust generated by first AF actuator 346 to differ from thrust generated by second AF actuator 347 during autofocusing. Specifically, during autofocusing, AF actuator 345 detects the position of first AF magnet 346a by first AF controller 346c (that is, first detection part 346e), and detects the position of second AF magnet 347a by second AF controller 347c (that is, second detection part 347e).

Further, AF actuator 345 controls the current value of first AF coil 346b by first AF controller 346c (that is, first driving control section 346f), and controls the current value of second AF coil 347b by second AF controller 347c (that is, second driving control section 347f). Thus, thrust generated by first AF actuator 346 and thrust generated by second AF actuator 347 are caused to differ from each other. Based on such a difference in thrust, AF actuator 345 generates thrust including thrust parallel to the X direction (first thrust) and the resistance force (second thrust) described above. Specifically, the thrust parallel to the X direction is a resultant force of thrust generated by first AF actuator 346 and thrust generated by second AF actuator 347. Further, the resistance force (second thrust) described above is a moment (see arrow $A_r$ in FIG. 23A) generated based on a difference between thrust generated by first AF actuator 346 and thrust generated by second AF actuator 347.

Note that, the first current value described above and the second current value described above are selected from spare data stored in first driving control section 346f and second driving control section 347f, by calibration performed in advance, for example. The spare data includes, for example, AF parameters composed of the direction of displacement (for example, the direction of arrow $A_{X1}$ in FIG. 23A), amount of displacement $D_3$ (see FIG. 23A), the direction of deviation of lens guide 341 from the X direction (for example, the direction of arrow $A_X$ in FIG. 23A), and amount of deviation $D_4$ of lens guide 341 from the X direction (see FIG. 23A) in a case where lens guide 341 is displaced in the X direction by AF actuator 345, and the first current value and the second current value that set amount of deviation $D_4$ described above (including an inclination) stored in association with the AF parameters to zero. In the calibration described above, the first current value and the second current value corresponding to the AF parameters are determined in an overall stroke range of lens guide 341 in the X direction.

The resistance force generated by AF actuator 345 against the external force described above is, for example, a rotational moment in the direction of arrow $A_r$ in FIG. 23A. Further, AF actuator 345 causes generated thrust (a resultant force of the first thrust and the second thrust) to act on lens guide 341. As a result, lens guide 341 on which such a resultant force acts is displaceable in parallel to the X direction as in arrow $A_{X1}$ in FIG. 23A in a state where the external force acts.

Figure 23B:
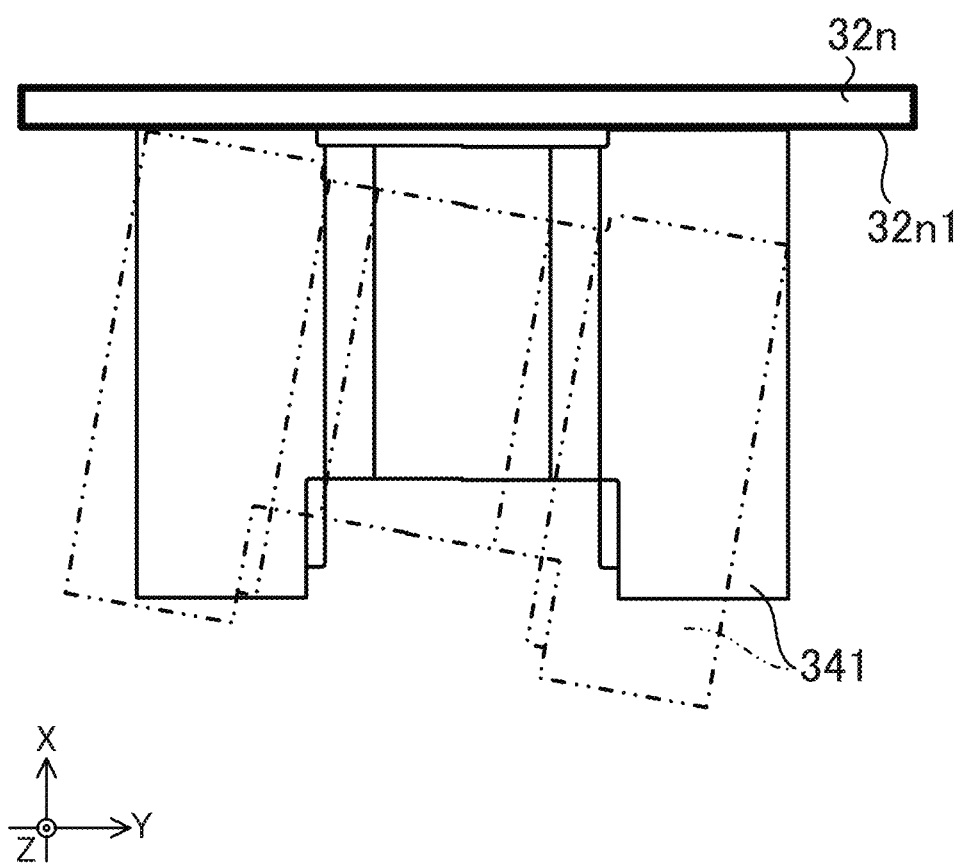
FIG. 23B is a schematic plan view of a lens guide and a reference member.

Note that, as illustrated by the long dashed double-short dashed line in FIG. 23B, a force such as to cause lens guide 341 to be inclined with respect to the Y direction and the Z direction (specifically, first reference surface 32n1 of reference part 32n) may act on lens guide 341 in a state in which lens guide 341 stops. Such a force is generated due to an assembly error, individual differences between springs 342a1 to 342a4 forming first support mechanism 342 or the like. When such an inclination is present, lens guide 341 is displaced while the inclination is maintained during autofocusing.

Accordingly, in the case of the present embodiment, as indicated by the solid line in FIG. 23B, the calibration described above is performed by using a state, in which an end surface on the + side in the X direction of lens guide 341 is caused to abut on first reference surface 32n1 of reference part 32n (that is, the reference state of lens guide 341), as a reference. Thus, during the autofocusing described above, lens guide 341 can be displaced in the X direction while a state in which lens guide 341 is not inclined with respect to first reference surface 32n1 of reference part 32n (that is, the state of lens guide 341 indicated by the solid line in FIG. 23B) is maintained. Further, according to the configuration described above, there is a possibility that work of active alignment between prism module 2 and lens module 3 can be omitted or simplified in the assembly process of camera module 1.

[Operation and Effect of Present Embodiment]

As described above, camera module 1 according to the present embodiment is capable of accurately displacing lens guide 341 toward the Y direction, which is the specific direction, during shake correction. Further, camera module 1 according to the present embodiment is capable of accurately displacing lens guide 341 toward the X direction, which is the specific direction, during autofocusing.

Embodiment 2

Figure 24:
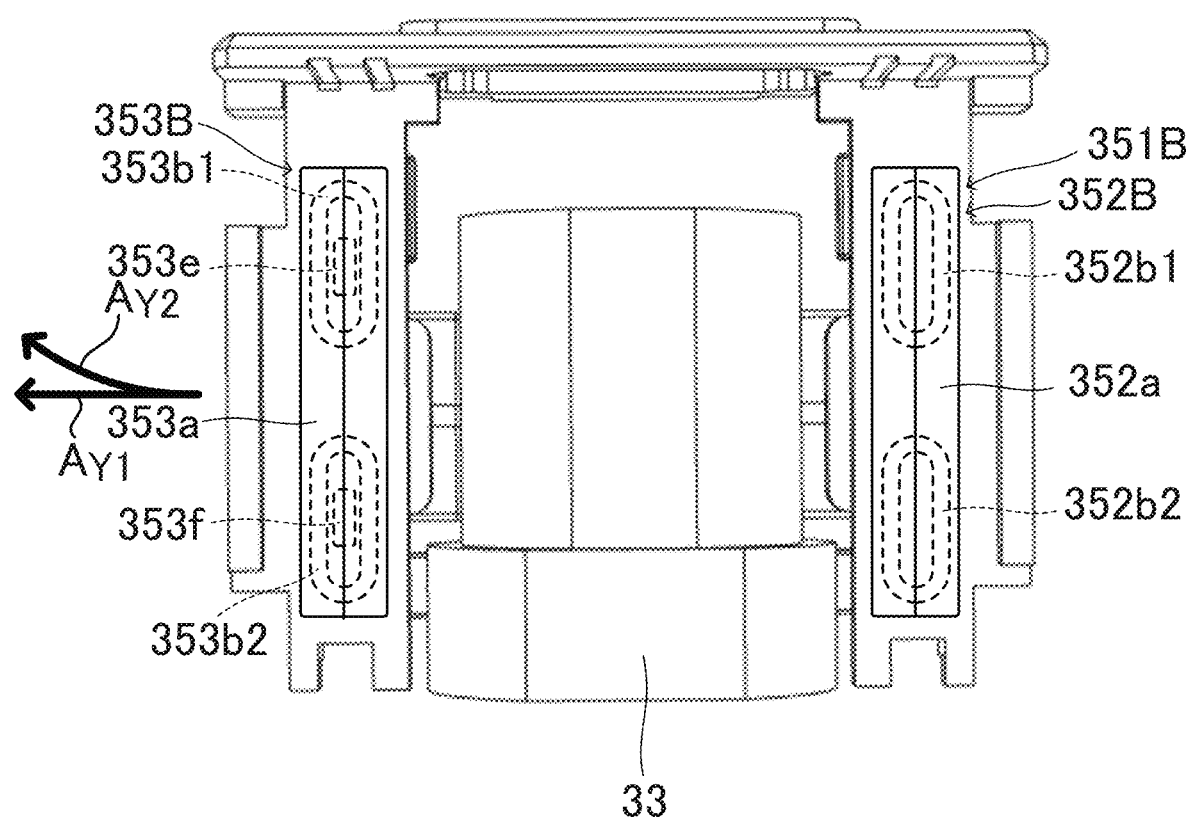
FIG. 24 is a plan view of the lens module according to Embodiment 2 in a state in which part of the lens module is omitted.

Embodiment 2 according to the present invention will be described with reference to FIGS. 24 and 25. In a camera module of the present embodiment, rear-side OIS actuator 351B of a second shake correction apparatus has a structure different from that of Embodiment 1 described above. Hereinafter, the camera module of the present embodiment will be described by focusing on a structure thereof different from that of Embodiment 1.

Rear-side OIS actuator 351B is a driving mechanism, and includes first OIS actuator 352B arranged on the + side in the Y direction and second OIS actuator 353B arranged on the − side in the Y direction.

First OIS actuator 352B includes first OIS magnet 352a and a pair of first OIS coils 352b1 and 352b2. First OIS magnet 352a is the same as that in Embodiment 1 described above.

Each of the pair of first OIS coils 352b1 and 352b2 is a so-called air-core coil having an oval shape, to which power is supplied during shake correction. Each of the pair of first OIS coils 352b1 and 352b2 is fixed, in a state in which the major axes coincide with the X direction, to coil mount part 32i of second base 32, in a state in which first OIS coils 352b1 and 352b2 are separated from each other in the X direction.

Second OIS actuator 353B includes second OIS magnet 353a, a pair of second OIS coils 353b1 and 353b2, first OIS controller 353e, and second OIS controller 353f. Second OIS magnet 353a is the same as that in Embodiment 1 described above.

Each of the pair of second OIS coils 353b1 and 353b2 is a so-called air-core coil having an oval shape, to which power is supplied during shake correction. Each of the pair of second OIS coils 353b1 and 353b2 is fixed, in a state in which the major axes coincide with the X direction, to coil mount part 32j of second base 32, in a state in which second OIS coils 353b1 and 353b2 are separated from each other in the X direction.

Although illustration is omitted, second OIS coil 353b1 is electrically connected to first OIS coil 352b1. Second OIS coil 353b2 is electrically connected to first OIS coil 352b2.

Figure 25:
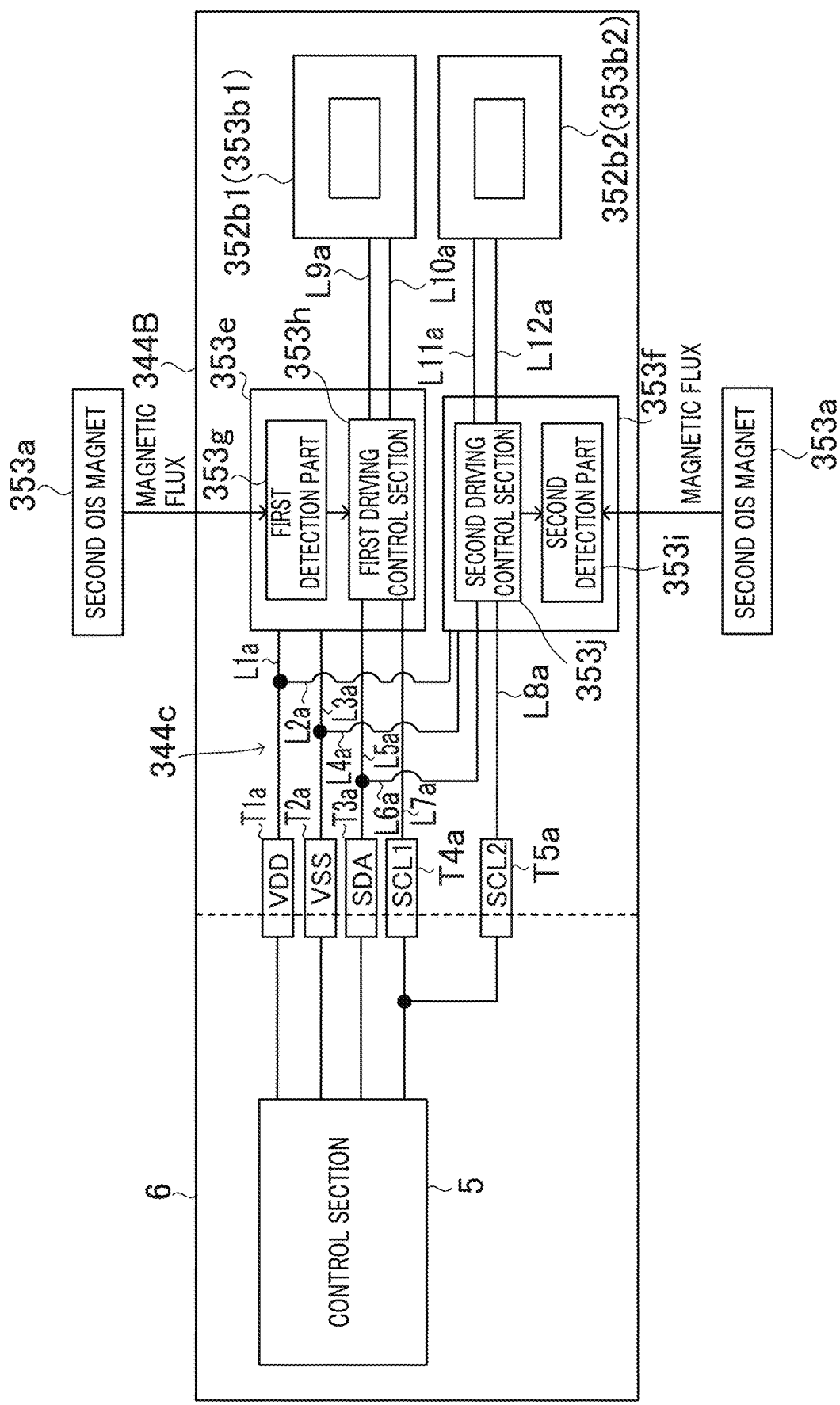
FIG. 25 is a circuit diagram of an OIS driving control circuit.

As illustrated in FIG. 25, first OIS coil 352b1 and second OIS coil 353b1 are connected to first OIS controller 353e via first coil power supply lines L9a and L10a. The current values of first OIS coil 352b1 and second OIS coil 353b1 are controlled by first OIS controller 353e.

Further, as illustrated in FIG. 25, first OIS coil 352b2 and second OIS coil 353b2 are connected to second OIS controller 353f via second coil power supply lines L11a and L12a. The current values of first OIS coil 352b2 and second OIS coil 353b2 are controlled by second OIS controller 353f.

First OIS controller 353e is fixed to FPC 344B. First OIS controller 353e as such includes first detection part 353g and first driving control section 353h.

First detection part 353g detects magnetic flux (also referred to as positional information) of second OIS magnet 353a at a position where first detection part 353g is fixed. First detection part 353g transmits a detected value to first driving control section 353h.

First driving control section 353h controls the current values of first OIS coil 352b1 and second OIS coil 353b1 based on a detected value received from first detection part 353g. Note that, first driving control section 353h does not control the current values of first OIS coil 352b2 and second OIS coil 353b2.

Second OIS controller 353f is fixed to FPC 344B. Second OIS controller 353f as such includes second detection part 353i and second driving control section 353j.

Second detection part 353i detects magnetic flux (also referred to as positional information) of second OIS magnet 353a at a position where second detection part 353i is fixed. Second detection part 353i transmits a detected value to second driving control section 353j.

Second driving control section 353j controls the current values of first OIS coil 352b2 and second OIS coil 353b2 based on a detected value received from second detection part 353i. Note that, second driving control section 353j does not control the current values of first OIS coil 352b1 and second OIS coil 353b1.

Rear-side OIS actuator 351B as described above is connected to control section 5 by OIS driving control circuit 344c as illustrated in FIG. 25. OIS driving control circuit 344c is provided in FPC 344B.

As illustrated in FIG. 25, OIS driving control circuit 344c includes first power supply line L1a, second power supply line L2a, first grounding line L3a, second grounding line L4a, first data signal line L5a, second data signal line L6a, first clock line L7a, second clock line L8a, first coil power supply lines L9a and L10a, and second coil power supply lines L11a and L12a. OIS driving control circuit 344c as such is substantially the same as AF driving control circuit 344b in Embodiment 1 described above. Accordingly, a detailed description of OIS driving control circuit 344c is omitted. For OIS driving control circuit 344c, the description of AF driving control circuit 344b in Embodiment 1 described above can be varied as appropriate.

In the configuration of the present embodiment as described above, thrust generated by an actuator (hereinafter, referred to as first actuator) formed by first OIS coil 352b1, second OIS coil 353b1, first OIS magnet 352a and second OIS magnet 353a and thrust generated by an actuator (hereinafter, referred to as second actuator) formed by first OIS coil 352b2, second OIS coil 353b2, first OIS magnet 352a and second OIS magnet 353a can be caused to differ from each other by independently controlling the current values of first OIS coil 352b1 and second OIS coil 353b1 and the current values of first OIS coil 352b2 and second OIS coil 353b2.

Specifically, in a case where thrust generated by the first actuator and thrust generated by the second actuator are the same, thrust generated by rear-side OIS actuator 351B is composed only of first thrust in the Y direction. On the other hand, in a case where thrust generated by the first actuator and thrust generated by the second actuator are different, thrust generated by rear-side OIS actuator 351B includes first thrust in the Y direction, which is a resultant force of thrust generated by the first actuator and thrust generated by the second actuator, and second thrust which is a moment around center of gravity G of the movable-side member generated based on the resultant force.

Such second thrust serves as a resistance force that resists an external force to cause lens guide 341 to deviate from the Y direction during shake correction. Thus, the amount of deviation of lens guide 341 from the X direction can be reduced or be set to zero by rear-side OIS actuator 351B during shake correction. Other configuration, operation, and effect are the same as in Embodiment 1 described above.

Note that, for the operation of the camera module according to the present embodiment during shake correction, the operation of the camera module according to Embodiment 1 described above may be varied as appropriate. Further, the configuration of the present embodiment and the configuration of Embodiment 1 described above can be combined as appropriate for implementation unless technically contradicted.

[Additional Remark]

Although the invention made by the present inventors has been specifically described thus far based on some embodiments, the present invention is not limited to the above-described embodiments and can be modified without departing from the gist thereof.

In each embodiment described above, the camera module includes the first support mechanism that elastically supports the movable-side member with respect to the fixed-side member, and the second support mechanism that supports the movable-side member with respect to the fixed-side member such that the movable-side member is displaceable within the XY plane and is non-displaceable in the Z direction.

In a case where the present invention is implemented, however, the configurations of the support mechanisms supporting the movable-side member such that the movable-side member is displaceable with respect to the fixed-side member are not limited to the first support mechanism and the second support mechanism described above.

For example, in a case where the present invention is implemented, at least one support mechanism of the first support mechanism and the second support mechanism described above may be omitted. For example, lens module 3B illustrated in FIG. 26 has a configuration in which first support mechanism 342 (see FIGS. 9C, 10, and 14) is omitted from lens module 3 of Embodiments 1 and 2 described above.

Figure 26:
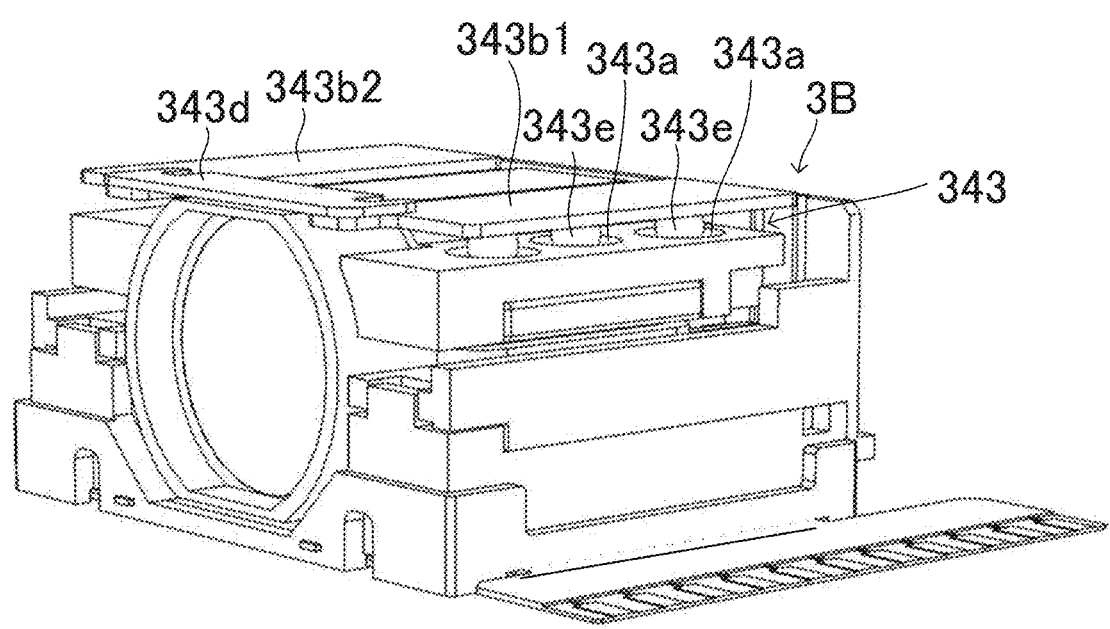
FIG. 26 is a perspective view of Modification 1 of the lens module.

That is, lens module 3B illustrated in FIG. 26 includes only second support mechanism 343 (see FIGS. 9C and 10) in Embodiments 1 and 2 described above as a support mechanism supporting the movable-side member such that the movable-side member is displaceable with respect to the fixed-side member. The structure of second support mechanism 343 is the same as that of Embodiment 1 described above. Further, lens module 3B illustrated in FIG. 26 does not include first support mechanism 342 and therefore does not have a configuration corresponding to first support mechanism 342 (for example, spring arrangement parts 32m1 to 32m4 of second base 32, and/or the like; see FIGS. 9C and 10) either.

Note that, although illustration is omitted, the lens module may include only first support mechanism 342 in Embodiments 1 and 2 described above as a support mechanism supporting the movable-side member such that the movable-side member is displaceable with respect to the fixed-side member. Further, the first support mechanism elastically supporting the movable-side member with respect to the fixed-side member may be formed by a plurality of suspension wires (not illustrated) instead of spring arrangement parts 32m1 to 32m4.

Further, for example, although a smartphone, which is a camera-equipped mobile terminal, has been described as an example of the camera-mounted apparatus including camera module 1 in each embodiment described above, the present invention is applicable to a camera-mounted apparatus including a camera module and an image processing part that processes image information obtained by the camera module. The camera-mounted apparatus includes an information apparatus and a transport apparatus. The information apparatus includes, for example, a camera-equipped mobile phone, a notebook computer, a tablet terminal, a portable game machine, a web camera, and a camera-equipped in-vehicle apparatus (such as a rear-view monitor apparatus and a drive recorder apparatus). Further, the transport apparatus includes, for example, an automobile.

Figure 28A:
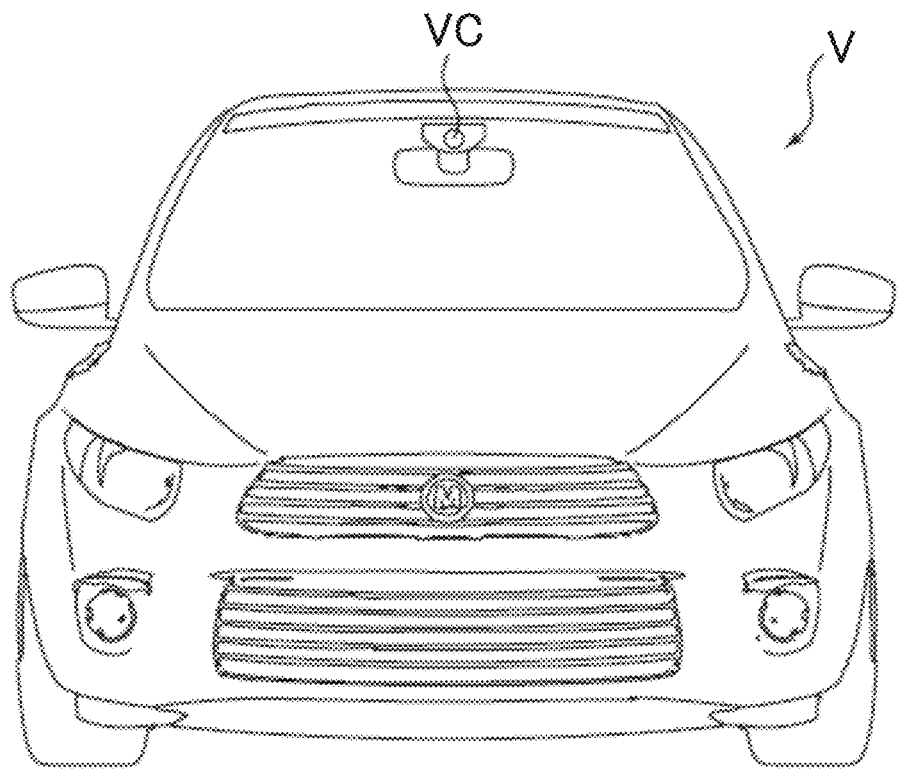
FIGS. 28A and 28B illustrate an automobile as a camera-mounted apparatus on which an in-vehicle camera module is mounted.
Figure 28B:
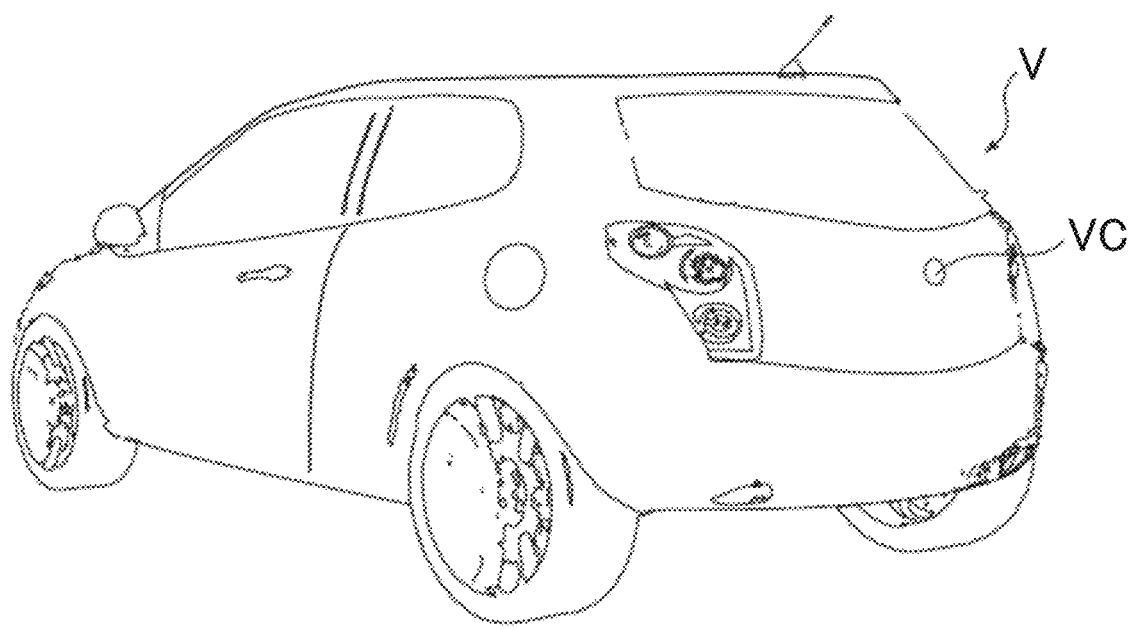

FIGS. 28A and 28B illustrate automobile V as a camera-mounted apparatus on which in-vehicle camera module VC (Vehicle Camera) is mounted. FIG. 28A is a front view of automobile V, and FIG. 28B is a rear perspective view of automobile V. In automobile V, camera module 1 described in the embodiments is mounted as in-vehicle camera module VC. As illustrated in FIGS. 28A and 28B, in-vehicle camera module VC is attached to the windshield to face the front side or is attached to the rear gate to face the rear side, for example. This in-vehicle camera module VC is used for a rear-view monitor, a drive recorder, collision-prevention control, automatic operation control, or the like.

Further, the configurations of the AF voice coil motor and the OIS voice coil motor in the present invention are not limited to those indicated in each embodiment described above.

Further, as a support mechanism supporting the movable-side member with respect to the fixed-side member, an elastic support member composed of elastomer or the like, for example, may also be applied instead of springs 342a1 to 342a4 of first support mechanism 342 indicated in each embodiment described above.

The present invention is also applicable to a lens driving apparatus that does not have the OIS function and has only the AF function. Further, the present invention is also applicable to a lens driving apparatus that does not have the AF function and has only the OIS function.

Each of the embodiments disclosed herein should be considered exemplary in all respects, and not limiting. The scope of the present invention is indicated not by the above description, but by the claims, and is intended to include meanings equivalent to the scope of the claims and all modifications within the scope.

The disclosure of Japanese Patent Application No. 2018-87355, filed on Apr. 27, 2018, including the specification, drawings and abstract, is incorporated herein by reference in its entirety.

INDUSTRIAL APPLICABILITY

A camera actuator and a camera module according to the present invention can be mounted on a thin camera-mounted apparatus such as a smartphone, a mobile phone, a digital camera, a notebook computer, a tablet terminal, a portable game machine, and an in-vehicle camera, for example.

REFERENCE SIGNS LIST

1 Camera module
2 Prism module
21 First cover
22 First base
220 Base-side opening
223 First accommodation space
224a, 224b First side wall part
224c1, 224c2 First weir part
224d1, 224d2 Second weir part
224e1, 224e2, 224f1, 224f2 Spring arrangement space
224g1, 224g2, 224g3 Protrusion
224h1, 224h2, 224h3 Protrusion
225c First receiver part
225d Second receiver part
226 First positioning protrusion
227 Second positioning protrusion
229 Bottom wall part
23 Prism
231 Optical path bending surface
24 First shake correction apparatus
241 Holder
241a Mounting surface
241f, 241g Opposing wall part
241q, 241r Overhang part
243 Swing support spring
243a, 243b First locking part
243c Second locking part
243d, 243e First through-hole
243f Second through-hole
243g Twist allowing part
243h Spring-side guide surface
243i Continuous part
243j, 243k Continuous part element
243j1 Base end-side continuous part
243j2 Meandering continuous part
244 Front-side OIS actuator
244a First magnet
244c First coil
244e First Hall element 245 Swing guide member
25 FPC
27 Damping member
3, 3B Lens module
31 Second cover
31a Top plate part
31b Front plate part
31c Rear plate part
31d First side plate part
31e Second side plate part
31f Cutout part
31g Front-side opening
31h Corner part
31i Rear-side opening
32 Second base
32a Lower-side base element
32b Upper-side base element
32c Second accommodation space
32d Bottom part
32e, 32f Bottom through-hole
32g, 32h Second side wall part
32a1 Second lower wall element
32a2 Second lower wall element
32b1 Second upper wall element
32b2 Second upper wall element
32i, 32j Coil mount part
32k Reinforcing plate
32m1, 32m2, 32m3, 32m4 Spring arrangement part
32n Reference part
32n1 First reference surface
33 Lens part
34 AF apparatus
341 Lens guide
341a Lens holding part
34a1, 34a2 First overhang part
34a3, 34a4 Second overhang part
34a5, 34a6 First magnet holding part
34a7, 34a8 Second magnet holding part
34b1, 34b2 Space
34b3, 34b4 Third magnet holding part
34b5, 34b6 Fourth magnet holding part
342 First support mechanism
342a1, 342a2, 342a3, 342a4 Spring
342b First fixed part
342c Second fixed part
342d Connection part
342e First bending part
342f Second bending part
343 Second support mechanism
343a Ball holding part
343b1, 343b2 Track member
343c Track surface
343d Connection member
343e Ball
344, 344B FPC
344a FPC base
34d1 First terminal part
34d2 Second terminal part
34d3 Third terminal part
34d4 First coil fixed part
34d5 Second coil fixed part
34d6 First controller fixed part
34d7 Second controller fixed part
34d8 Hall element fixed part
344b AF driving control circuit
L1, L1a First power supply line
L2, L2a Second power supply line
L3, L3a First grounding line
L4, L4a Second grounding line
L5, L5a First data signal line
L6, L6a Second data signal line
L7, L7a First clock line
L8, L8a Second clock line
L9, L10, L9a, L10a First coil power supply line
L11, L12, L11a, L12a Second coil power supply line
L13, L14 Signal line
T1, T1a Power supply terminal
T2, T2a Grounding terminal
T3, T3a Data signal terminal
T4, T4a First clock terminal
T5, T5a Second clock terminal
344c OIS driving control circuit
345, 345A AF actuator
346, 346A First AF actuator
346a First AF magnet
346b First AF coil
346c, 346c2 First AF controller
346d First X-position detecting magnet
346e, 346e2 First detection part
346f First driving control section
347, 347A Second AF actuator
347a Second AF magnet
347b Second AF coil
347c, 347c2 Second AF controller
347d Second X-position detecting magnet
347e Second detection part
347f Second driving control section
35 Second shake correction apparatus
351, 351B Rear-side OIS actuator
352, 352B First OIS actuator
352a First OIS magnet
352b, 352b1, 352b2 First OIS coil
352c Y-position detecting magnet
353, 353B Second OIS actuator
353a Second OIS magnet
353b, 353b1, 353b2 Second OIS coil
353c Y-position detecting magnet
353d OIS Hall element
353e First OIS controller
353f Second OIS controller
353g First detection part
353h First driving control section
353i Second detection part
353j Second driving control section
4 Imaging element module
5 Control section
6, 6B Sensor board
6a Board-side circuit
7a, 7b Shield plate
V Automobile
VC In-vehicle camera module
M Smartphone

The invention claimed is:

1. A camera actuator, comprising:
a fixed-side member;
a movable-side member provided so as to be displaceable with respect to the fixed-side member and holding a lens part; and
a driving section including a driving mechanism that generates a driving force that displaces the movable-side member within a plane including a first direction which is a direction of a light entering the lens and a second direction orthogonal to the first direction, wherein:

the driving mechanism includes a pair of driving mechanism parts that generate, for autofocusing, a driving force in the same direction to displace the movable-side member in the first direction, the pair of driving mechanism parts generates as the driving force a resultant force obtained by combining thrust that displaces the movable-side member in a specific direction that is the first direction, and a resistance force that resists an external force acting so as to cause the movable-side member to deviate from the specific direction; and the pair of driving mechanism parts generates the resistance force based on a spare data stored by calibration performed in advance, wherein:

the spare data includes an amount of displacement of the movable-side member in the specific direction in the autofocusing, an amount of deviation of the movable-side member from the specific direction corresponding to the amount of displacement, and a current value which sets the amount of deviation to zero; and the resistance force is a force to reduce the amount of deviation of the movable-side member corresponding to the amount of displacement of the movable-side member in the specific direction in the autofocusing.

2. The camera actuator according to claim 1, wherein:

the driving section includes a power supply part that causes the driving force to be generated from the driving mechanism by supplying power to the driving mechanism, wherein the driving section generates the resistance force by controlling power supply in accordance the external force.

3. The camera actuator according to claim 2, wherein:

the pair of driving mechanism parts are arranged side by side in a direction different from the specific direction, and the pair of driving mechanism parts generates the resistance force to suppress deviation from the specific direction by causing the thrust generated from each of the pair of driving mechanism parts to differ from each other by individually controlling amounts of power supply to the pair of driving mechanism parts.

4. The camera actuator according to claim 3, wherein:

each of the pair of driving mechanism parts is a voice coil motor including a coil part and a magnet part, the driving mechanism part generating the resistance force, and each of the pair of driving mechanism parts generate the resistance force by controlling an amount of power supply from the power supply part to the coil part in accordance with the external force.

5. The camera actuator according to claim 1, further comprising:

a support mechanism supporting the movable-side member such that the movable-side member is displaceable with respect to the fixed-side member within the plane.

6. The camera actuator according to claim 5, wherein the support mechanism is a plurality of elastic support members elastically supporting the movable-side member with respect to the fixed-side member.

7. The camera actuator according to claim 6, wherein the plurality of elastic support members are dispersedly arranged around the movable-side member.

8. The camera actuator according to claim 7, wherein the support mechanism is a plurality of balls rotatably held between the movable-side member and the fixed-side member.

9. The camera actuator according to claim 6, wherein:

the support mechanism supports the movable-side member in a state in which displacement of the movable-side member with respect to the fixed-side member in a direction intersecting the plane is regulated, and the driving section generates the resistance force that resists the external force acting to cause the movable-side member to deviate from the specific direction within the plane.

10. A camera module, comprising:

the camera actuator according to claim 1, and an imaging element arranged at a stage subsequent to a lens part.

11. A camera-mounted apparatus, comprising:

the camera module according to claim 10, and a control section that controls the camera module.

* * * * *